United States Patent
Pillai et al.

(10) Patent No.: US 10,528,322 B2
(45) Date of Patent: Jan. 7, 2020

(54) UNIFIED MULTIFUNCTION CIRCUITRY

(71) Applicant: Intel IP Corporation, Santa Clara, CA (US)

(72) Inventors: Kamlesh R. Pillai, Bangalore (IN); Gurpreet S. Kalsi, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 81 days.

(21) Appl. No.: 15/859,164

(22) Filed: Dec. 29, 2017

(65) Prior Publication Data

US 2019/0042192 A1 Feb. 7, 2019

(51) Int. Cl.
| | | |
|---|---|---|
| *G06F 7/483* | (2006.01) | |
| *G06F 5/01* | (2006.01) | |
| *G06F 7/48* | (2006.01) | |
| *G06F 7/523* | (2006.01) | |

(52) U.S. Cl.
CPC ............ *G06F 7/4833* (2013.01); *G06F 5/012* (2013.01); *G06F 7/4824* (2013.01); *G06F 7/5235* (2013.01)

(58) Field of Classification Search
CPC ...... G06F 7/4833; G06F 5/012; G06F 7/4824; G06F 7/5235
USPC ................ 708/209, 277, 512, 517
See application file for complete search history.

(56) References Cited

U.S. PATENT DOCUMENTS

| | | | | |
|---|---|---|---|---|
| 4,700,319 A | * | 10/1987 | Steiner ................... | G06F 7/483 382/303 |
| 8,990,278 B1 | * | 3/2015 | Clegg ..................... | G06F 7/544 708/272 |
| 2003/0220953 A1 | * | 11/2003 | Allred ................... | G06F 1/0307 708/277 |
| 2004/0267854 A1 | * | 12/2004 | Haider ................... | G06F 7/556 708/512 |
| 2015/0113027 A1 | * | 4/2015 | Chen ...................... | G06F 7/556 708/204 |

OTHER PUBLICATIONS

Nowatzki, Tony, et al.: "Stream-Dataflow Acceleration", ISCA '17, Jun. 24-28, 2017, Toronto, ON, Canada, 14 pages.

* cited by examiner

*Primary Examiner* — Tan V Mai
(74) *Attorney, Agent, or Firm* — Grossman, Tucker, Perreault & Pfleger, PLLC

(57) ABSTRACT

One embodiment provides a unified multifunction circuitry. The unified multifunction circuitry includes a logarithm circuitry and an antilogarithm circuitry. The logarithm circuitry is to determine a log output operand. The log output operand includes a piecewise linear approximation of a base 2 logarithm of a significand of a log input operand. The antilogarithm circuitry is to determine an antilog output operand. The antilog output operand includes a piecewise linear approximation of a base 2 antilogarithm of a fraction of a selected input operand.

24 Claims, 21 Drawing Sheets

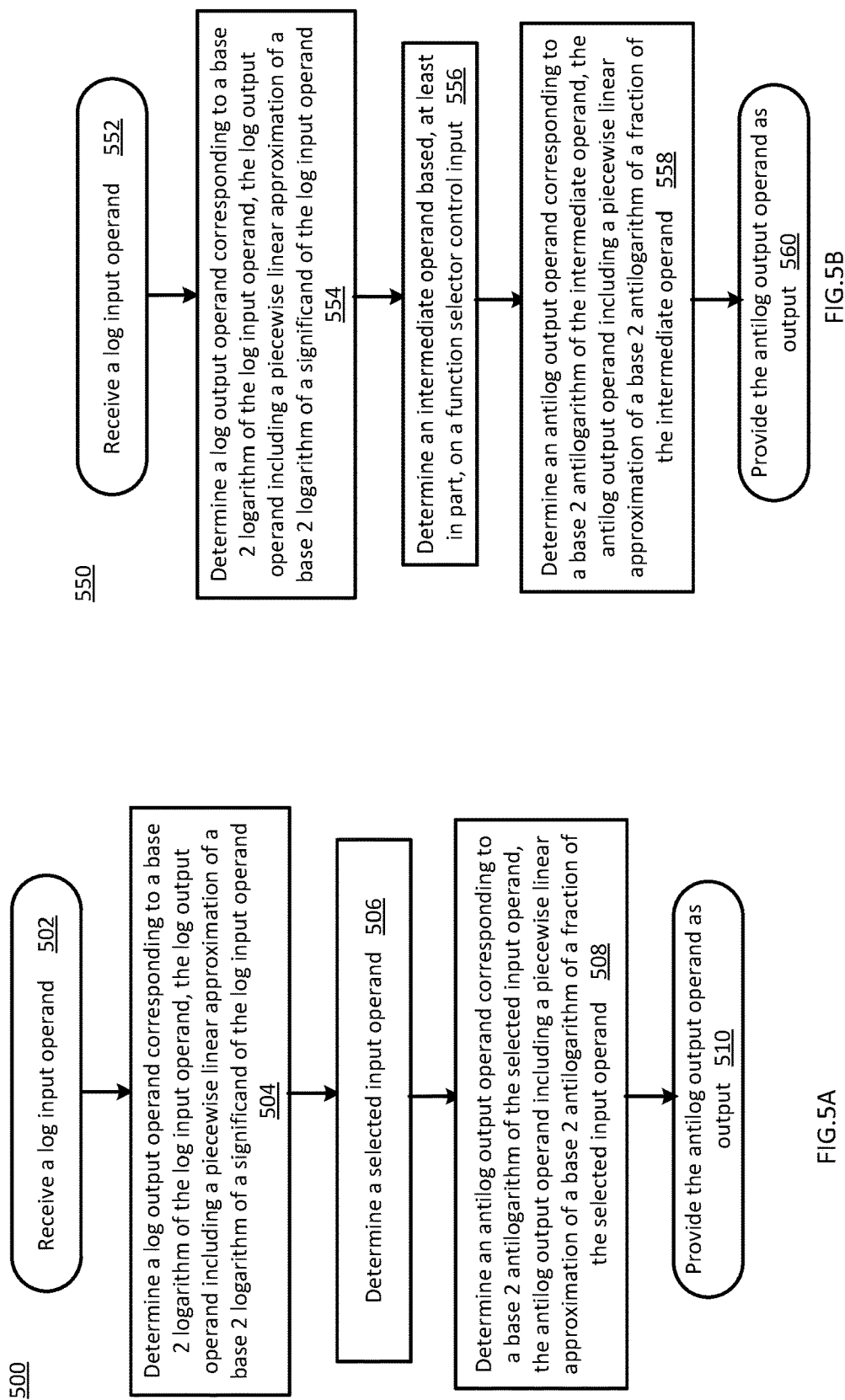

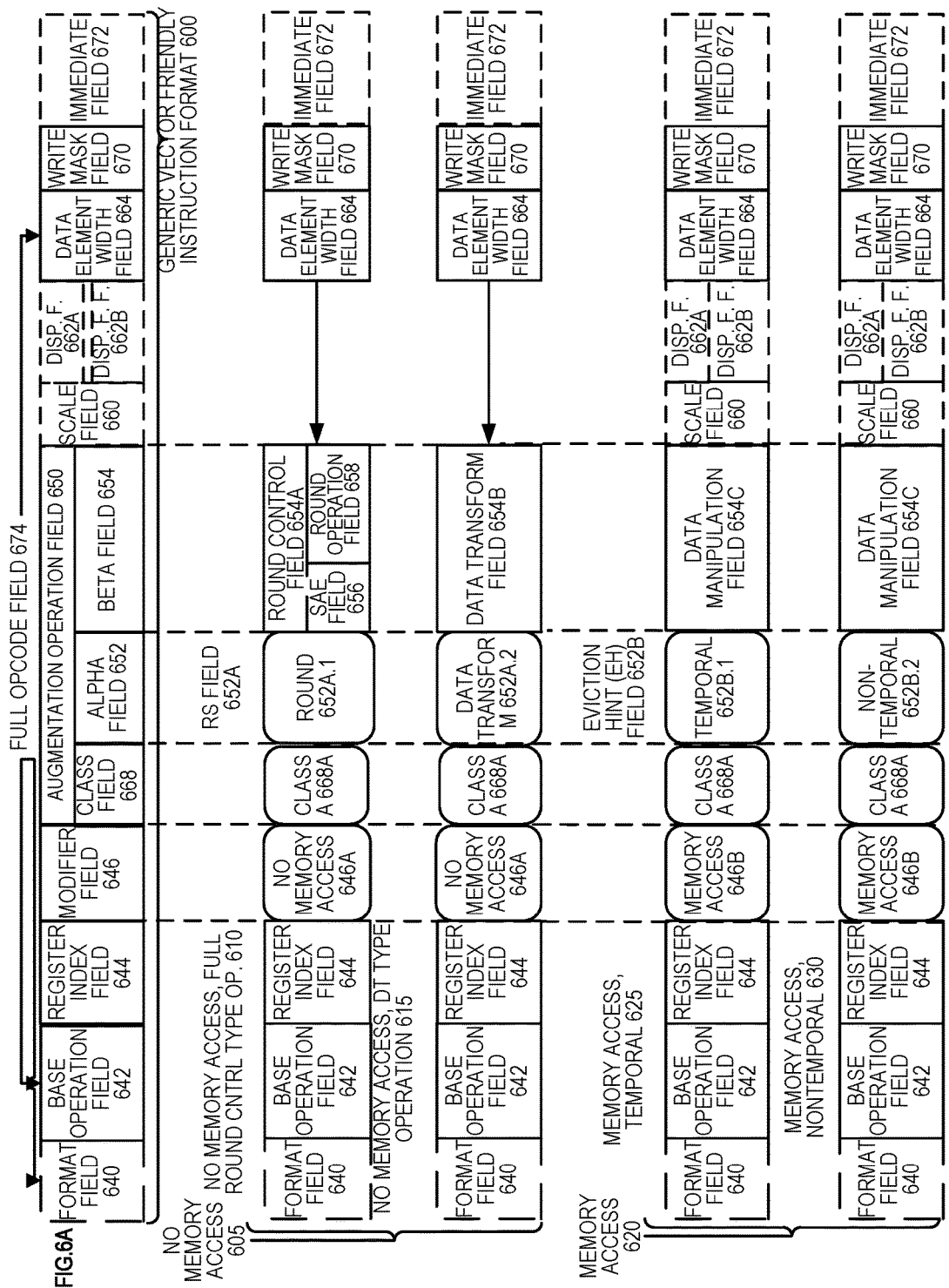

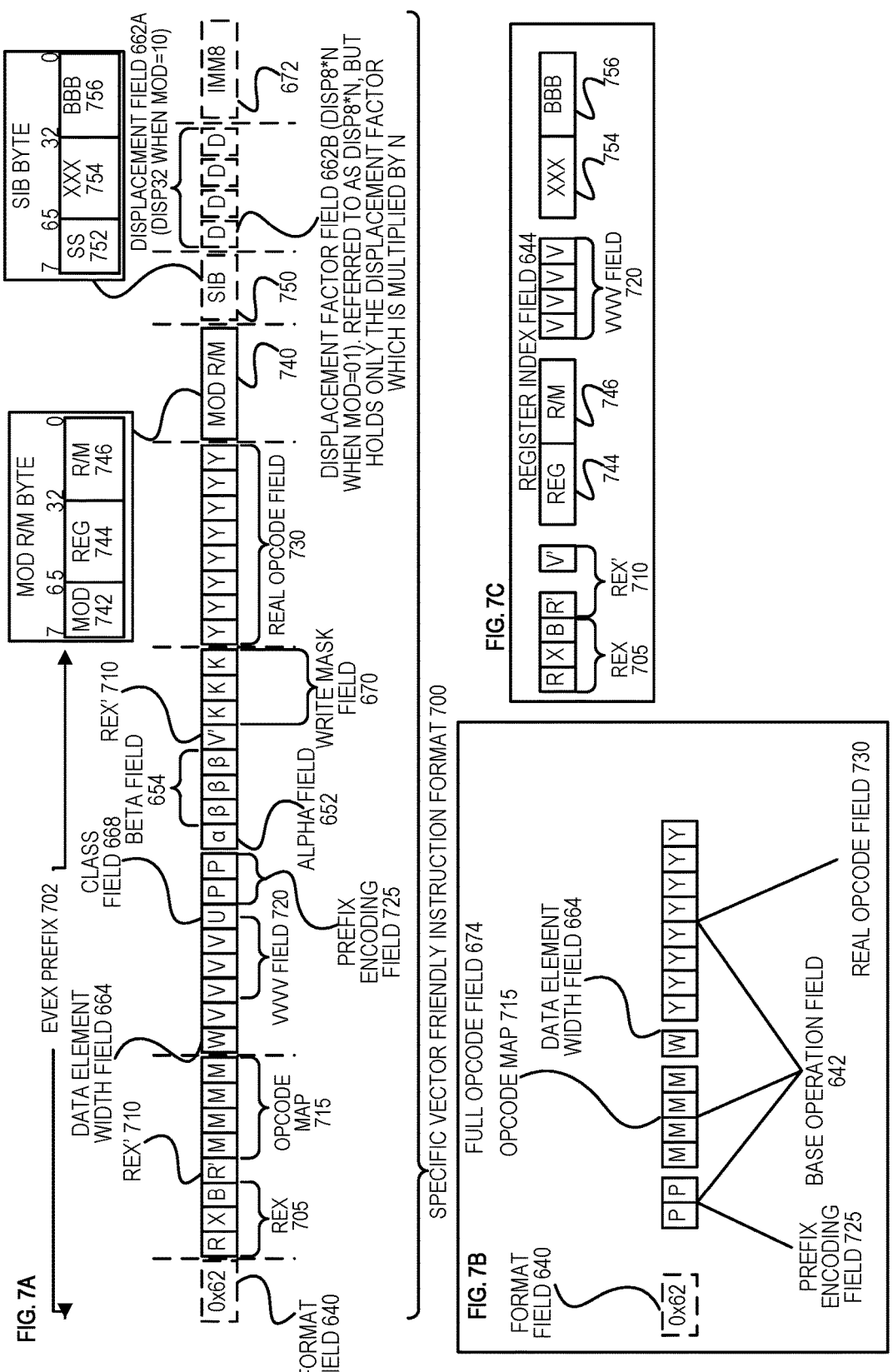

FIG. 8
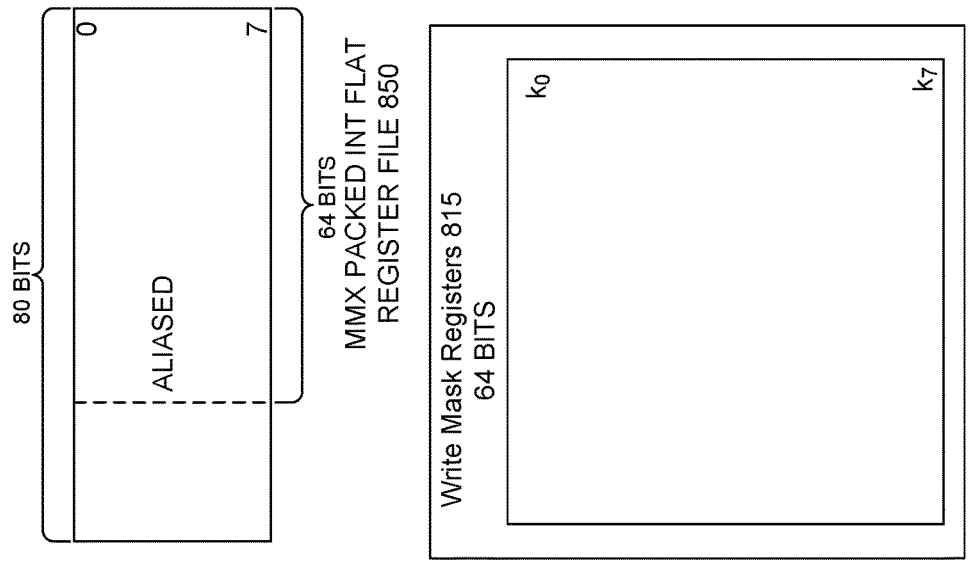
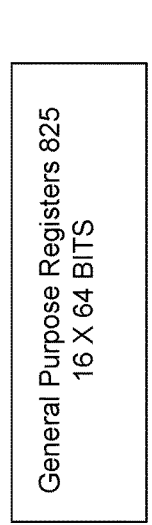
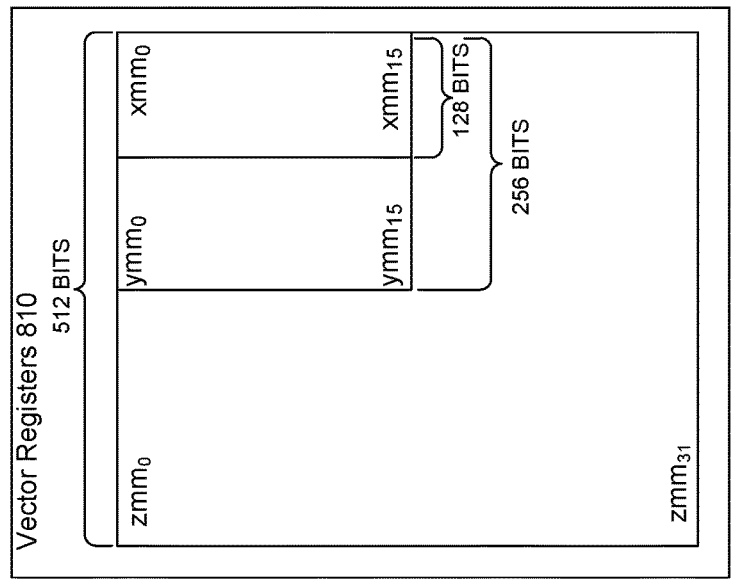

UNIFIED MULTIFUNCTION CIRCUITRY

FIELD

The present disclosure relates to a multifunction circuitry, in particular to, a unified multifunction circuitry.

BACKGROUND

Machine learning, computer vision, neural networks, augmented reality (AR)/virtual reality (VR) & drones utilize applications that are dynamic and can be unpredictable. Application-specific compute blocks and accelerators may be configured to implement selected operations and/or selected functions. In some situations, by the time accelerators are productized, the operations and functions may have changed thus reducing computational efficiency.

Application-specific circuitry may include a plurality of individual functional blocks. Each functional block may be configured to perform a respective operation such as square root, inverse square root, logarithm, antilogarithm and inverse of floating point number. Such individual functional blocks may occupy a significant amount of area of an integrated circuit (IC). One or more functional blocks may be configured to use look up tables (LUT), which may further increase area, power consumption and latency.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 5A is a flowchart of unified multifunction circuitry operations according to various embodiments of the present disclosure;

FIG. 5B is another flowchart of unified multifunction circuitry operations according to various embodiments of the present disclosure;

FIGS. 6A-6B are block diagrams illustrating a generic vector friendly instruction format and instruction templates thereof according to embodiments of the invention;

FIGS. 7A-D are block diagrams illustrating an exemplary specific vector friendly instruction format according to embodiments of the invention;

FIG. 8 is a block diagram of a register architecture according to one embodiment of the invention;

Figure 1:
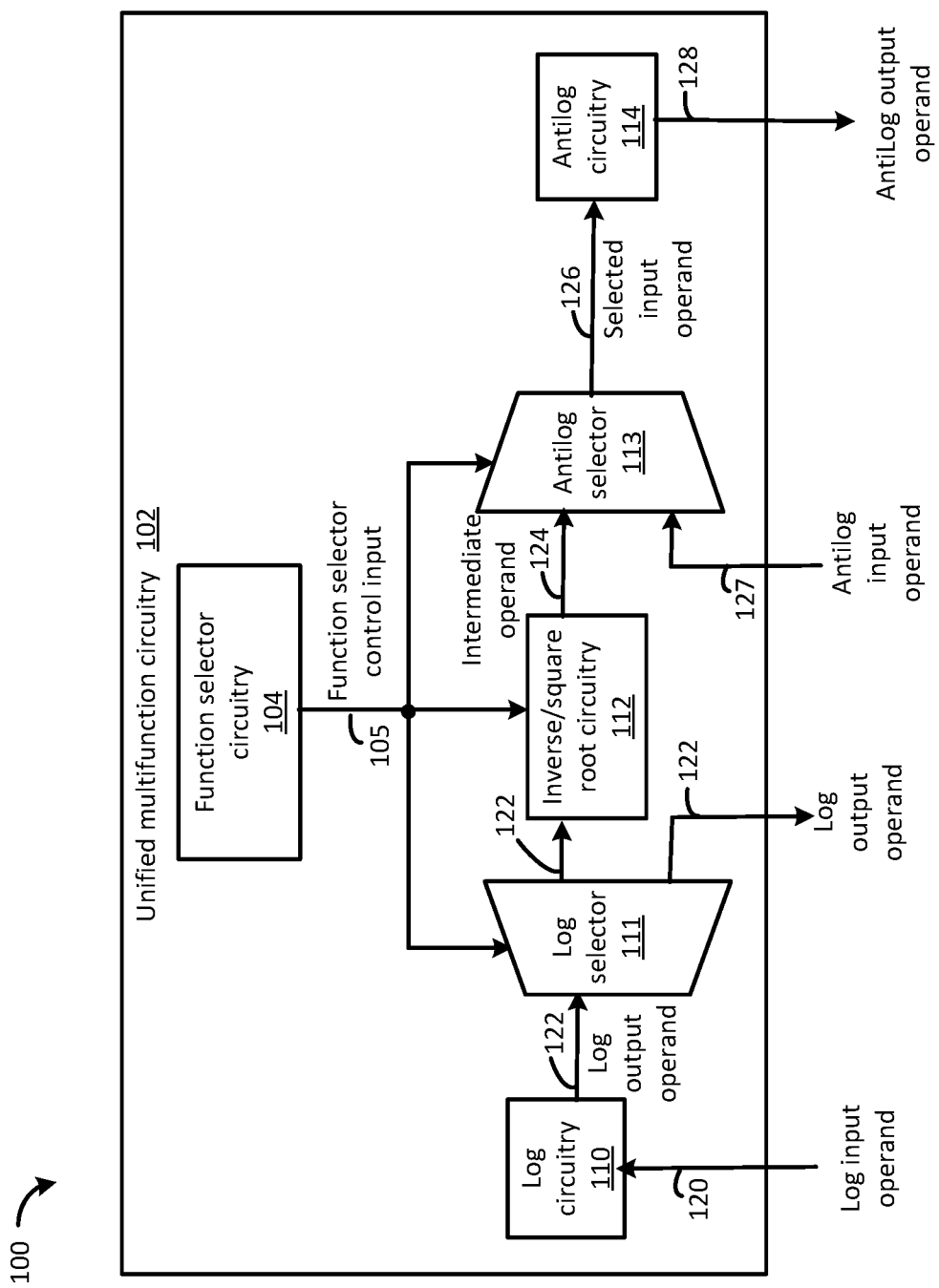
FIG. 1 illustrates a functional block diagram of a system that includes a unified multifunction circuitry consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a unified multifunction circuitry. The unified multifunction circuitry is configured to receive a floating-point number and to transform the floating-point number to a corresponding fixed point number using a base 2 logarithm. A fraction portion of the fixed point number may include a piecewise linear approximation of the base 2 logarithm of a significand of the floating-point number. The unified multifunction circuitry may be configured to perform one or more arithmetic operations (e.g., inverse and/or square root) on the fixed point number to yield a fixed point intermediate operand. The unified multifunction circuitry is then configured to transform the fixed point intermediate operand to an output floating-point number using a base 2 antilogarithm. A significand (and mantissa) portion of the output floating-point number may include a piecewise linear approximation of the base 2 antilogarithm of a fraction portion of the fixed point intermediate operand.

A precision of a piecewise linear approximation is related to a number of segments included in a range of the significand and/or a range of the fraction portion. Each piecewise linear approximation may be further approximated by a plurality of sums of terms where each sum of terms corresponds to a respective slope and a respective intercept of a respective segment. Each term is configured to include a factor that is a negative power of 2. The terms may thus be implemented by right shifting binary bits. A complexity of the unified multifunction circuitry is related to the number of segments and the number of terms associated with each segment, as will be described in more detail below.

In a digital system (e.g., a computing system, an integrated circuit, etc.), a real number may be represented as a floating-point number (e.g., a 32-bit single precision floating-point number, a 64-bit double precision floating-point number) and/or a fixed point number. A floating-point number that contains a number, n, bits has a much larger dynamic range then a fixed point number that contains the same number, n, bits. Generally, operations utilizing floating-point numbers are more computationally intensive compared to operations utilizing fixed point numbers. Floating-point operations may thus consume more system resources (e.g., clock cycles, power, processing unit resources, etc.) compared to fixed point operations. Fixed point operations may thus be faster while trading off dynamic range. As will be described in more detail below, a base 2 logarithm may be utilized to transform a floating-point number into a fixed point number and a base 2 antilogarithm may be utilized to transform a fixed point number into a floating-point number. In some situations, an input floating-point number may be transformed into a corresponding fixed point number, a selected operation, for example, a square root operation and/or an inverse operation may be performed on the fixed point number and the resulting fixed point number may be transformed into an output floating-point number. Efficient transformations facilitate performing the selected operation(s) on a fixed point number thus preserving system resources as well as processing speed.

In a base 2 (i.e., binary) numbering system, a base 2 logarithm of an operand, X, may be written as:

$Y = \log_2(X)$ and a base 2 antilogarithm of an operand, X, may be written as:

$Y = 2^X$.

Utilizing a logarithmic identity ($X = 2^{(\log_2(X))}$), a square root of an operand, X, may be written as:

$Y = (X)^{1/2} = 2^{(1/2 * \log_2(X))}$, an inverse of an operand, X, may be written as:

$Y = (X)^{-1} = 2^{-(\log_2(X))}$, and an inverse square root of the operand, X, may be written as:

$Y = (X)^{-1/2} = 2^{-(1/2 * \log_2(X))}$.

Thus, a square root of an input operand, an inverse of an input operand and/or an inverse square root of an input operand may be determined utilizing a base 2 logarithm of the input operand to generate an intermediate operand. A base 2 antilogarithm of the intermediate operand may be determined to generate a corresponding output operand. The input operand and the output operand may generally correspond to floating-point numbers. The base 2 logarithm of the input operand and the intermediate operand may generally correspond to fixed point numbers. It may be appreciated that a divide by 2 (i.e., a multiply by one half) of a binary number corresponds to a right shift by one bit.

Generally, a binary representation of a floating-point number may include a sign bit, a number of exponent bits and a number of mantissa bits. In some representations, a significand corresponds to a mantissa plus a leading one and, in these representations, the exponent may be adjusted to accommodate the significand. The mantissa is explicitly stored while the leading one is implicitly understood to be present but is not explicitly stored. Storing the mantissa rather than the significand reduces by one bit (for each floating-point number) an amount of storage consumed by each corresponding floating-point number. For example, an Institute of Electrical and Electronics Engineers standard, IEEE 754, defines, among other things, a floating-point number format for single precision 32-bit floating-point numbers and double precision 64-bit floating-point numbers. A single precision 32-bit floating-point number includes a sign bit, an 8-bit exponent and a 23 bit mantissa corresponding to a 24-bit significand. A double precision 64 bit floating-point number includes a sign bit, and 11-bit exponent and a 52 bit mantissa corresponding to a 53-bit significand.

For example, a 32-bit floating point number may be written as:

$b_{31}b_{30} \ldots b_{23}b_{22} \ldots b_0$ where each $b_i$ is a bit, $b_{31}$ corresponds to a sign bit (s), bits $b_{30} \ldots b_{23}$ correspond to an 8 bit exponent (e) and bits $b_{22} \ldots b_0$ correspond to a 23 bit mantissa (m). The 32 bit floating-point number may then have a corresponding decimal value of:

$$\text{Value} = (-1)^{b_{31}} * \left(1 + \sum_{i=1}^{23} b_{23-i} * 2^{-i}\right) * 2^{(e-127)}$$

The −127 in the exponent corresponds to a bias and e may then correspond to an 8-bit unsigned integer with a value from 0 to 255. The number 1 added to the sum within the parentheses corresponds to the implicit leading one of the significand and the sum corresponds to the mantissa. A base 2 logarithm of the Value may then be written as:

$$\log_2(\text{Value}) = (-1)^{b_{31}} * \left[(e - 127) + \log_2\left(1 + \sum_{i=1}^{23} b_{23-i} * 2^{-i}\right)\right]$$

The base 2 logarithm of the value corresponds to a fixed point number with an integer portion corresponding to e−127 and a fraction portion corresponding to $\log_1(1 + \Sigma_{i=1}^{23} b_{23-i} * 2^{-i})$. Thus, a binary floating-point number may correspond to a fixed point number in a base 2 logarithm domain. The fixed point number may be transformed into the floating-point domain by adding a bias to an integer portion to yield an exponent and applying a base 2 antilogarithm to the fraction portion to yield a significand (i.e., leading one plus mantissa).

Generally, this disclosure relates to a unified multifunction circuitry. An apparatus, method and/or system are configured to perform a base 2 logarithm (y=log$_2$ (x)), a base 2 antilogarithm (y=2$^x$), an inverse (y=1/x), a square root (y=x$^{1/2}$) and/or a combination thereof (e.g., inverse square root (y=x$^{-1/2}$)), of a floating point number. The unified multifunction circuitry may include a logarithm circuitry and an anti-logarithm circuitry. The logarithm circuitry is configured to receive a floating-point log input operand and to determine a fixed point log output operand. The log input operand may include a sign bit, a number of exponent bits and a number of mantissa bits. The log output operand may include a sign bit, a number of integer bits and a number of fraction bits. The integer bits correspond to an unbiased exponent of the log input operand. The fraction bits correspond to a piecewise linear approximation of a base 2 logarithm of a significand (i.e., mantissa+1) of the log input operand.

The antilogarithm circuitry is configured to receive a selected input operand and to determine an antilog output operand. The selected input operand may correspond to an intermediate operand (that is related to the log input operand) or may correspond to an antilog input operand. The selected input operand corresponds to a fixed point number that includes a sign bit, a number of selected input operand integer bits and a number of selected input operand mantissa bits. The antilog output operand may include a sign bit, a number of bits corresponding to a biased exponent and a number of mantissa bits. The biased exponent corresponds to the selected input operand integer bits less a bias value (e.g., 127). The mantissa bits of the antilog output operand correspond to a piecewise linear approximation of a base 2 antilogarithm of a fraction portion of the selected input operand.

The unified multifunction circuitry may further include inverse and/or square root circuitry ("inverse/square root circuitry"). The inverse/square root circuitry is configured to determine at least one of an inverse and/or a square root of the log output operand. The log output operand corresponds to a fixed point representation of the floating-point log input operand. For example, the log output operand may correspond to a base 2 logarithm of the log input operand. The inverse and/or square root of the base 2 logarithm of the log input operand may then correspond to the intermediate operand. The antilog circuitry may then be configured to determine the base 2 antilogarithm of the intermediate operand (or the antilog input operand) to produce the log output operand.

Thus, the unified multifunction circuitry may be configured to receive a floating-point log input operand, to perform a base 2 logarithm (as described herein) to produce a fixed point log output operand. The log output operand may be output from the unified multifunction circuitry and/or may be provided to the inverse/square root circuitry. The inverse/square root circuitry may then operate on the fixed point log output operand to produce a fixed point intermediate operand. The unified multifunction circuitry may be further configured to receive a fixed point antilog input operand. The unified multifunction circuitry may then be configured to select the antilog input operand or the intermediate operand to determine a selected input operand. A base 2 antilogarithm may then be performed on the fixed point selected input operand to produce a corresponding floating-point antilog output operand. Unified multifunction circuitry may then be configured to provide as output the antilog output operand.

The unified multifunction circuitry is configured to occupy relatively less area than circuitry that includes one or more multipliers and/or one or more lookup tables (LUTs). The unified multifunction circuitry is configured to occupy relatively less area than individual circuitries with each individual circuitry configured to implement a respective one function of the plurality of functions implemented by the unified multifunction circuitry. Occupying relatively less area may facilitate implementing the unified multifunction circuitry in space constrained devices such as handheld devices.

The unified multifunction circuitry may be configured to determine the log output operand and/or intermediate operand in a first clock cycle. The unified multifunction circuitry may then be configured to determine the antilog output operand in a second clock cycle. Throughput may be increased by pipelining and/or implementing a plurality of unified multifunction circuitries in parallel. Whether a plurality of unified multifunction circuitries is implemented may be related to a particular application.

A target precision may be related to a type of application that utilizes the unified multifunction circuitry. Piecewise linear approximations for applications with relatively finer target precision may include relatively more segments compared to piecewise linear approximations for applications with relatively coarser target precision. Thus, the number of segments implemented by unified multifunction circuitry consistent with the present disclosure may be scaled based, at least in part, on the target precision.

For example, an application that utilizes Direct3D, e.g., Direct3D 12.1 and above, and/or OpenGL, e.g., OpenGL ES 3.1 and above, may be configured to utilize a unified multifunction circuitry, consistent with the present disclosure. In one nonlimiting example, a piecewise linear approximation with 16 segments for 32-bit single precision floating point and fixed point numbers may yield an approximation error of less than 0.083% (ABS).

In some embodiments, a unified multifunction circuitry may be utilized by a graphics library (GL) and/or application programming interface (API) associated with a GL for rendering two-dimensional (2D) and/or three-dimensional (3D) vector graphics.

For example, in one embodiment, the unified multifunction circuitry may comply and/or be compatible with OpenGL®, Release 4.6, released Jul. 31, 2017, by Khronos™ Group, and/or earlier and/or later and/or related versions of this GL and associated API, e.g., OpenGL ES™ (embedded system), Release 3.2, released Aug. 10, 2015, by Khronos™ Group.

In another example, in one embodiment, the unified multifunction circuitry may comply and/or be compatible with a DirectX® collection of APIs, e.g., DirectX®, Version 12.0, released Jul. 29, 2015, by Microsoft® Corporation, and/or earlier and/or later and/or related versions of these APIs, e.g., Direct3D® graphics API, Version 12.0, released Jul. 29, 2015, by Microsoft® Corporation, and/or earlier and/or later and/or related versions of this graphics API.

FIG. 1 illustrates a functional block diagram of a system 100 that includes a unified multifunction circuitry 102 consistent with several embodiments of the present disclosure. System 100 includes unified multifunction circuitry 102 and function selector circuitry 104. Function selector circuitry 104 may be included in or coupled to unified multifunction circuitry 102. Unified multifunction circuitry 102 includes base 2 logarithm circuitry ("log circuitry") 110, inverse and/or square root circuitry ("inverse/square root circuitry") 112 and base 2 antilogarithm circuitry ("antilog circuitry") 114.

Unified multifunction circuitry 102 is configured to receive a log input operand 120 and/or an antilog input operand 127. Unified multifunction circuitry 102 may then be configured to provide as output a log output operand 122 and/or an antilog output operand 128. The input operands 120, 127 may be received from, for example, processor 1100 of FIG. 11, processor 1210 and/or coprocessor 1245 of FIG. 12, one or more of processors/coprocessors 1370, 1380 and/or 1338 of FIG. 13, one or more of processors 1370 and 1380 of FIG. 14 and/or application processor 1510 of FIG. 15. The output operands 122, 128 may be provided to, for example, processor 1100, processor 1210 and/or coprocessor 1245, one or more of processors/coprocessors 1370, 1380 and/or 1338 of FIG. 13, one or more of processors 1370 and 1380 of FIG. 14 and/or application processor 1510.

In some embodiments, unified multifunction circuitry 102 may include a log selector 111 and/or an antilog selector 113. For example, log selector 111 may include, but is not limited to, a switch, a demultiplexer, etc. In another example, antilog selector 113 may include, but is not limited to, a switch, a multiplexer, etc. Log selector 111 is configured to couple an output of log circuitry 110, e.g., log output operand 122, to inverse/square root circuitry 112 or to a log output of unified multifunction circuitry 102. Antilog selector 113 is configured to select an output of inverse/square root circuitry 112, e.g., intermediate operand 124, or an antilog input of unified multifunction circuitry 102, e.g., antilog input operand 127, to couple to antilog circuitry 114. The selected output of antilog selector 113 may then correspond to selected input operand 126.

The log input operand 120 may be provided to and/or received by log circuitry 110. The antilog input operand 127 may be provided to, and/or received by, antilog selector 113. Antilog selector 113 may be further configured to receive an intermediate operand 124, as described herein. The antilog output operand 128 may be provided from antilog circuitry 114. The log input operand 120 and/or antilog output operand 128 may each be a single precision (e.g., 32-bit) floating-point number or a double precision (e.g., 64-bit) floating point number.

In one nonlimiting example, unified multifunction circuitry 102 may be configured to receive the log input operand 120 that may be, for example, a 32-bit floating-point number. Log circuitry 110 may be configured to determine a base 2 logarithm of the log input operand 120. The base 2 logarithm of the log input operand 120 may then correspond to a log output operand 122. The log output operand 122 may be a fixed point number. The log output operand 122 may then be provided to inverse/square root circuitry 112. The inverse square root circuitry 112 may then be configured to provide as output an intermediate operand 124. The intermediate operand 124 may then be provided to antilog circuitry 114 via, e.g., antilog selector 113. Antilog circuitry 114 may then be configured to determine a base 2 antilogarithm of the intermediate operand 124. The antilog output operand 128 may then correspond to the base 2 antilogarithm of the intermediate operand 124.

In another example, unified multifunction circuitry 102 may be configured to receive the antilog input operand 127, perform a base 2 antilogarithm on the antilog input operand 127 to produce a corresponding antilog output operand 128. The antilog input operand may be a fixed point number and the corresponding antilog output operand 128 may be a floating-point number. Thus, unified multifunction circuitry 102 may be configured to perform one or more of a base 2 logarithm, a base 2 antilogarithm and/or arithmetic operations (e.g., inverse and/or square root) on an operand.

Function selector circuitry 104 is configured to provide a function selector control input 105 for unified multifunction circuitry 102. The function selector control input 105 is configured to select the function or functions performed by unified multifunction circuitry 102. The function selector control input 105 is further configured to select inputs and/or outputs to/from logarithm circuitry 110 and/or antilogarithm circuitry 114. In an embodiment, the function selector circuitry 104 may be configured to provide the function selector control input 105 to selectors 111 and/or 113. For example, based, at least in part, on the function selector control input 105, log selector 111 may be configured to couple the log output operand 122 to inverse/square root circuitry 112 or to an output of unified multifunction circuitry 102. In another example, based, at least in part, on the function selector circuitry control input, antilog selector 113 may be configured to select the intermediate operand 124 output from inverse/square root circuitry 112 or the antilog input operand 127 as the selected input operand 126 that is input to antilog circuitry 114. In another embodiment, based, at least in part, on the function selector control input 105, inverse/square root circuitry 112 may be configured to determine an inverse of the log output operand 122, to determine a square root of the log output operand 122 or to determine an inverse square root of the log output operand 122. For example, the function selector control input 105 may include an inverse control input and a square root control input. Table 1 illustrates one nonlimiting example of binary function selector control input 105 values and their corresponding selected functionality.

TABLE 1

| Inverse | Square root | Functionality |
| --- | --- | --- |
| 0 | 0 | Logarithm and Antilogarithm base 2 of Floating Point Number |
| 0 | 1 | Square Root of Floating Point Number |
| 1 | 0 | Inverse of Floating Point Number (1/FP) |
| 1 | 1 | Inverse Square Root of Floating Point Number |

For example, when the inverse and the square root control input are both zero, the unified multifunction circuitry 102 may be configured to perform a base 2 logarithm of a floating-point number, i.e., the log input operand 120, to produce the log output operand 122 as an output of unified multifunction circuitry 102. The unified multifunction circuitry 102 may be further configured to perform a base 2 antilogarithm of a fixed point number, i.e., the antilog input operand 127, to produce the corresponding antilog output operand 128. In other words, the log circuitry 110 and the antilog circuitry 114 of the unified multifunction circuitry 102 are implemented as individual functional blocks. Thus, when inverse control input is zero and the square root control input is zero, these blocks may be used for determining a log base 2 of any floating point number and antilog base 2 for any fixed point number. When the inverse control input and/or square root control input are nonzero, the log output operand 122 may be coupled to inverse/square root circuitry 112 that may then operate on the fixed point log output operand to produce the intermediate operand that may then be selected for input to antilog circuitry 114. Antilog circuitry 114 may then perform a base 2 logarithm of the intermediate operand to produce the floating-point antilog output operand, as described herein.

Figure 11:
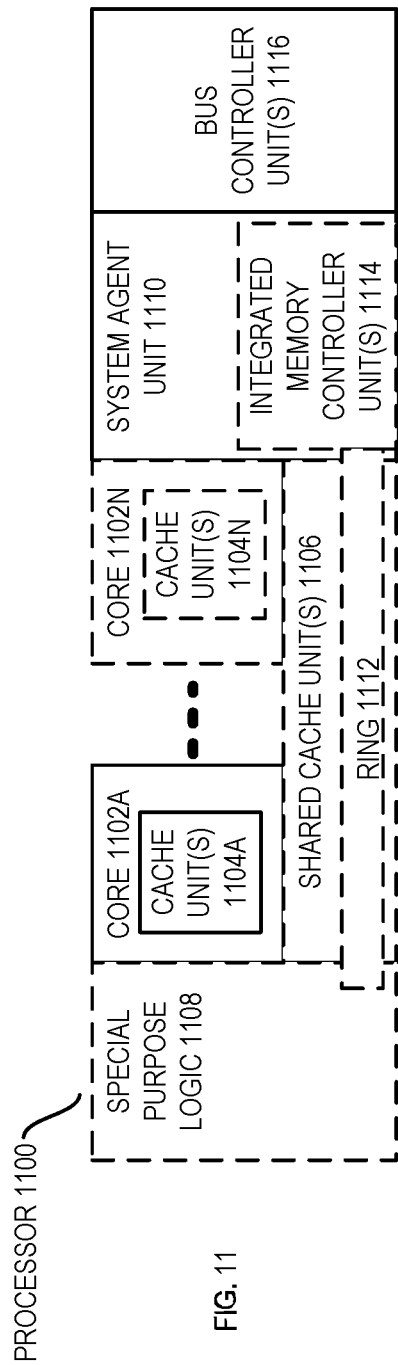
FIG. 11 is a block diagram of a processor that may have more than one core, may have an integrated memory controller, and may have integrated graphics according to embodiments of the invention.
Figure 12:
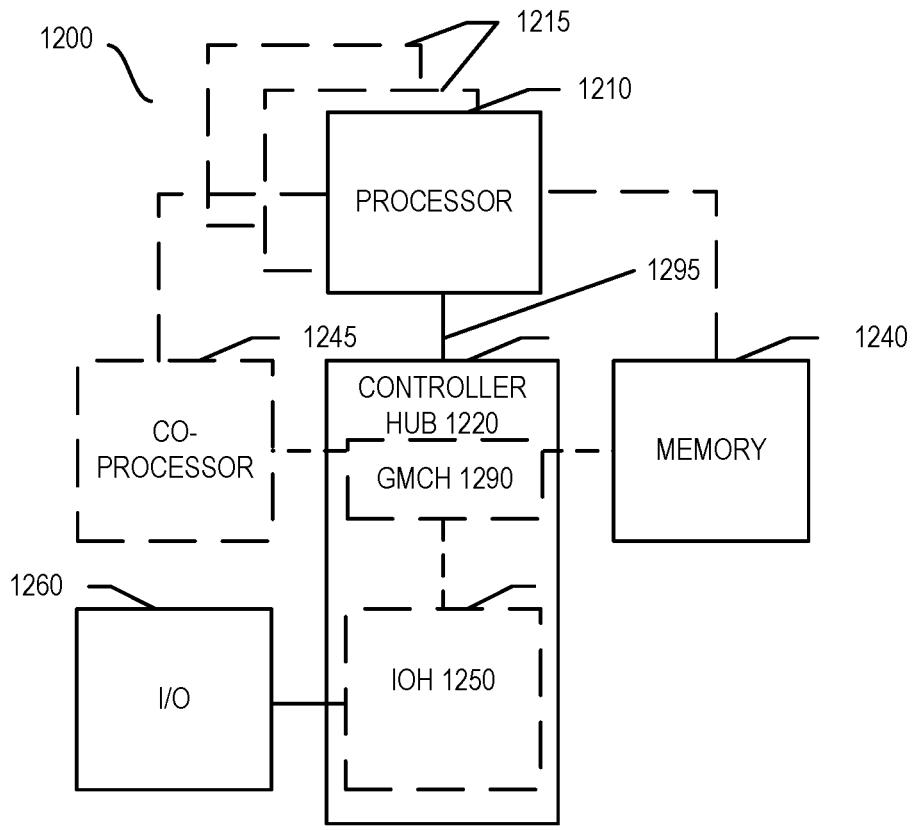
FIGS. 12-15 are block diagrams of exemplary computer architectures.
Figure 13:
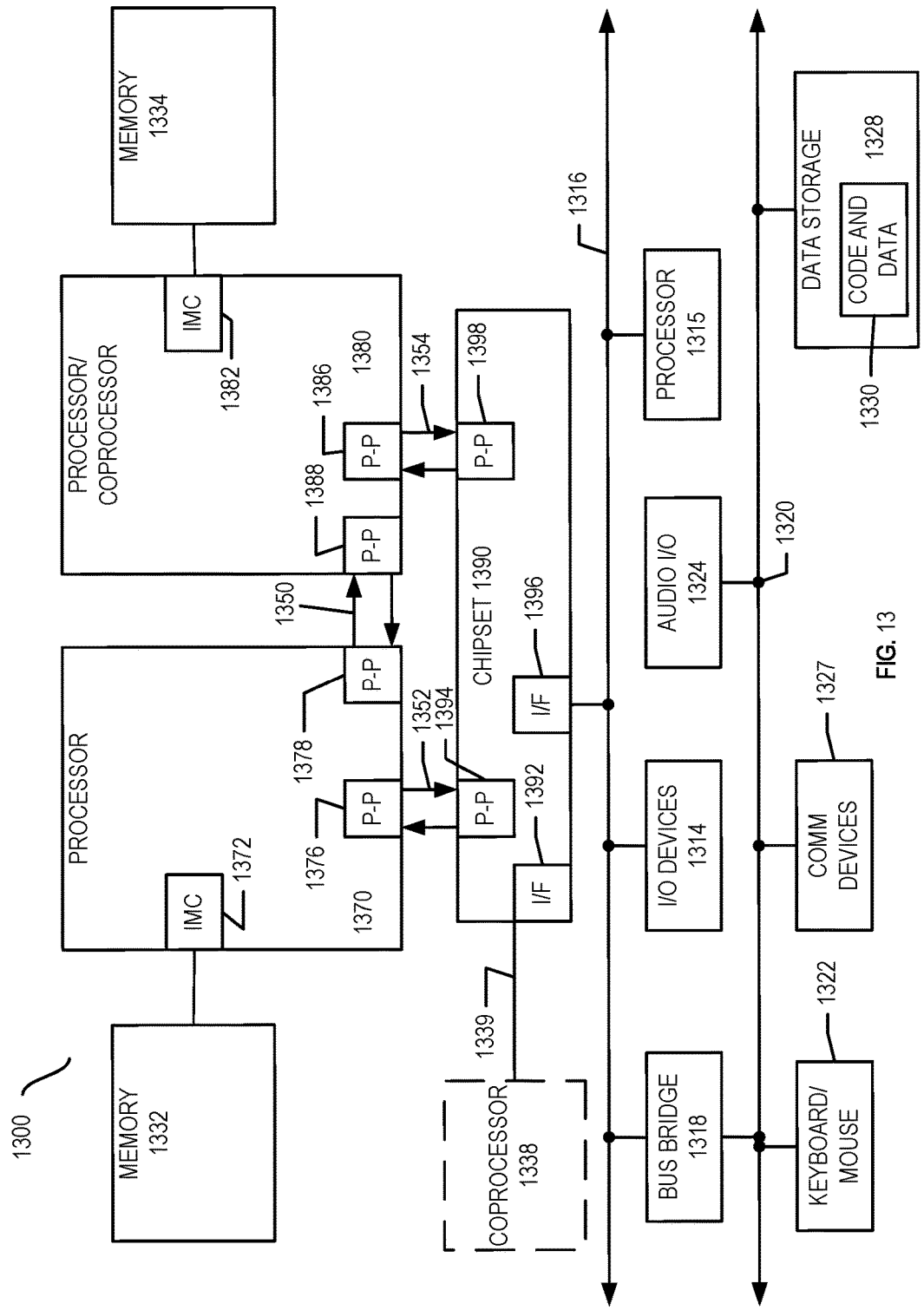
Figure 14:
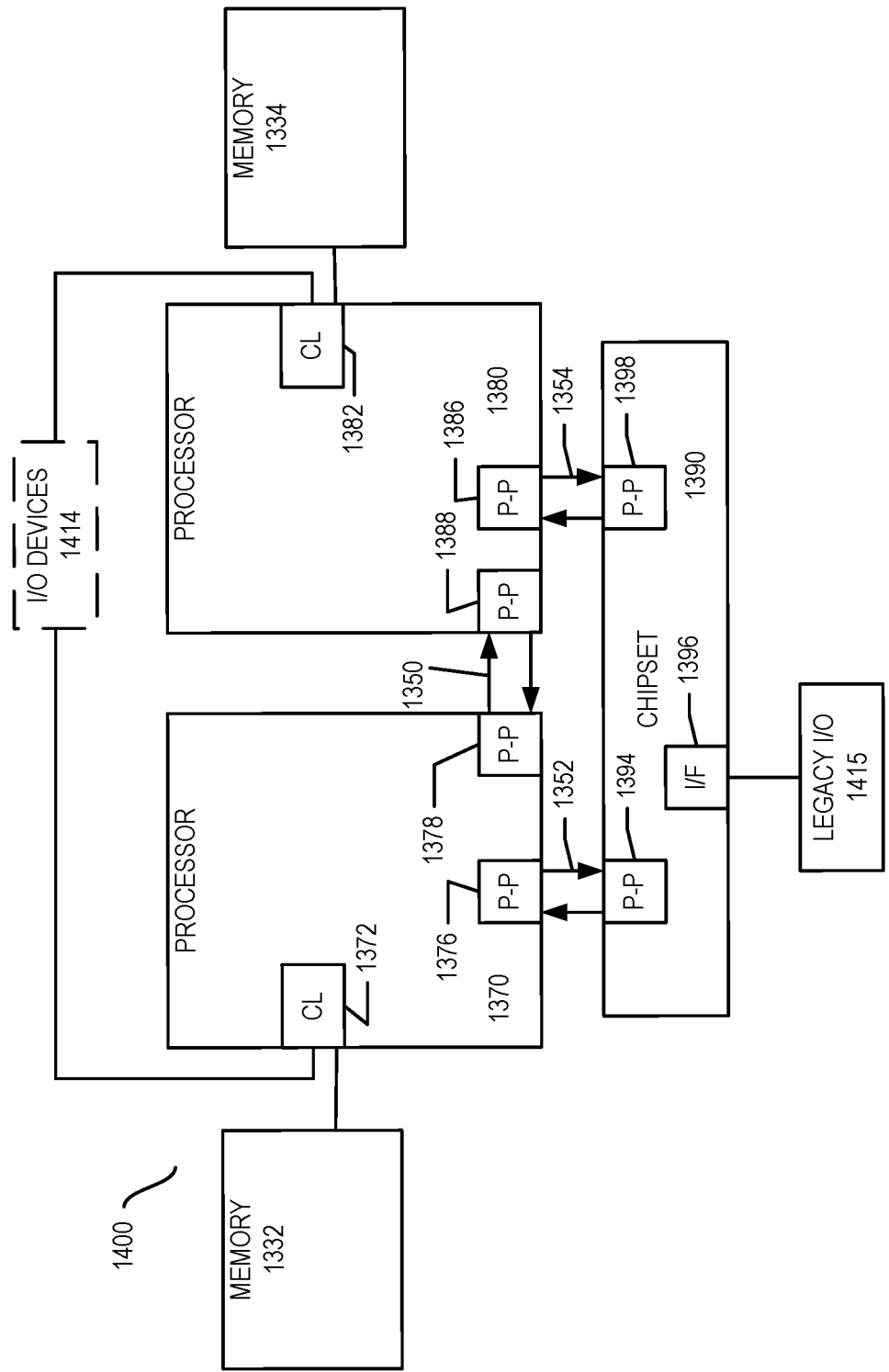
Figure 15:
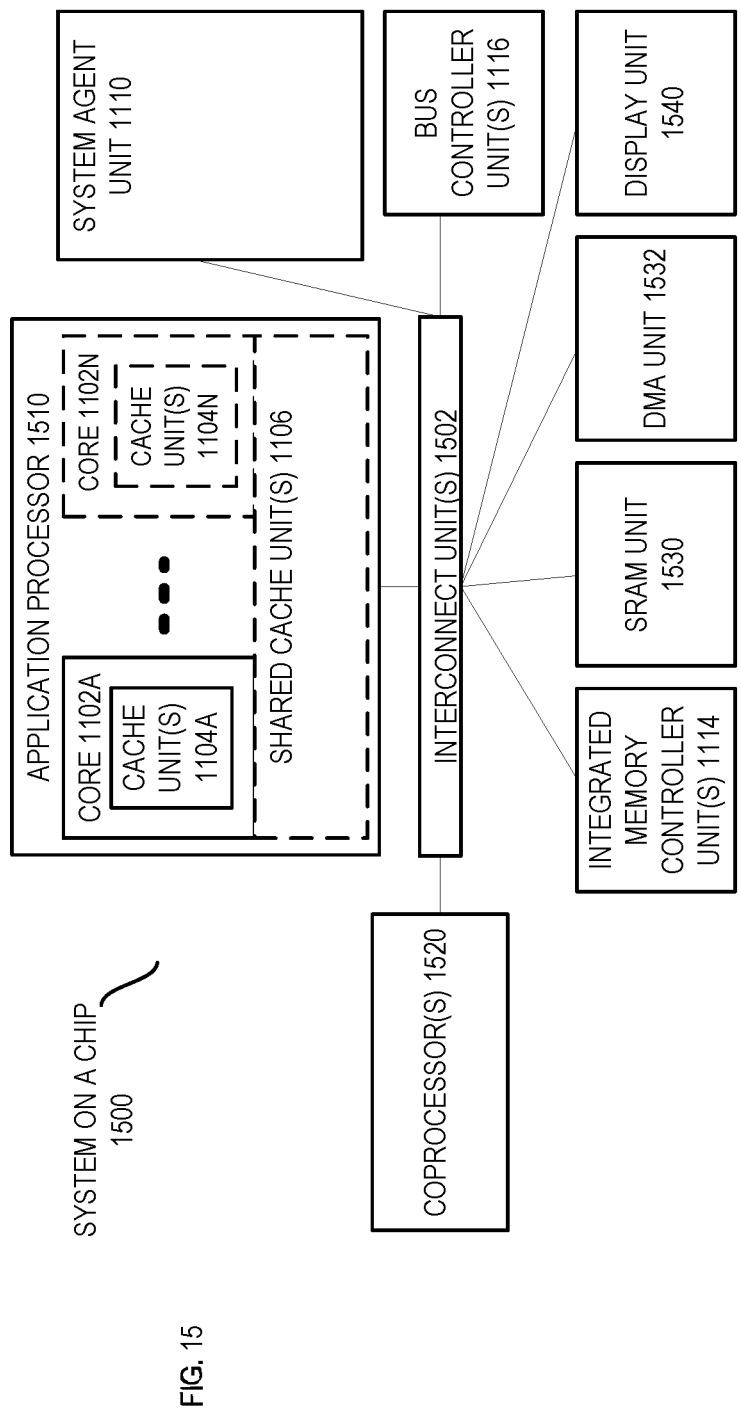

The function selector circuitry 104 may be included in and/or coupled to, for example, processor 1100 of FIG. 11, processor 1210 and/or coprocessor 1245 of FIG. 12, one or more of processors/coprocessors 1370, 1380 and/or 1338 of FIG. 13, one or more of processors 1370 and 1380 of FIG. 14 and/or application processor 1510 of FIG. 15. Thus, the operation or operations performed by unified multifunction circuitry 102 may be selected based, at least in part, on the function selector control input 105 provided by function selector circuitry 104.

Although the following describes a unified multifunction circuitry in the context of a 32-bit single precision floating point number, a unified multifunction circuitry may be similarly configured for other representations of floating-point numbers, e.g., 64-bit double precision, within the scope of the present disclosure.

Figure 2:
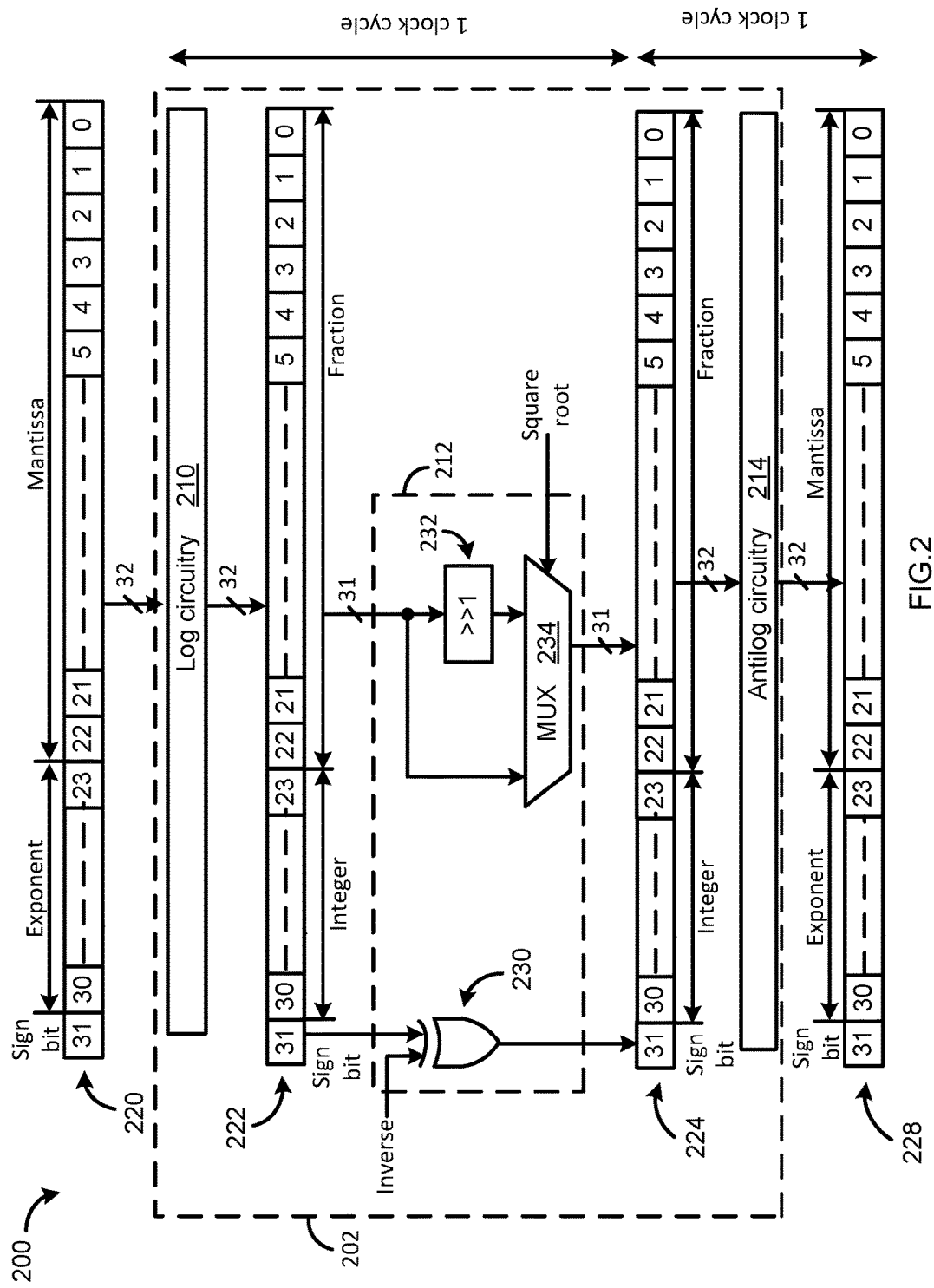
FIG. 2 is a functional block diagram of a system that includes one example unified multifunction circuitry consistent with one embodiment of the present disclosure.

FIG. 2 is a functional block diagram of a system 200 that includes one example unified multifunction circuitry 202, consistent with one embodiment of the present disclosure. Unified multifunction circuitry 202 is one example of unified multifunction circuitry 102 of FIG. 1. Unified multifunction circuitry 202 is configured to perform single precision 32-bit operations. Unified multifunction circuitry 202 includes log circuitry 210, inverse/square root circuitry 212 and antilog circuitry 214. Log circuitry 210 is one example of log circuitry 110. Inverse/square root circuitry 212 is one example of inverse/square circuitry 112. Antilog circuitry 214 is one example of antilog circuitry 114. In this example, the function selector control input is nonzero, thus the log input operand is provided to inverse/square root circuitry 212 and the intermediate operand (output from inverse/square root circuitry 112) is provided to antilog circuitry 114. However, this disclosure is not limited in this regard.

System 200 includes a floating-point log input operand 220, a fixed point log output operand 222, a fixed point intermediate operand 224 and a floating-point antilog output operand 228. The log input operand 220 and the antilog output operand 228 are 32-bit floating-point numbers. Log circuitry 210 is configured to receive the input operand 220 and may be configured to provide the log output operand 222 to the inverse/square root circuitry 212. The log output operand 222 is a 32-bit fixed point number corresponding to a base 2 logarithm of the input operand 220.

Inverse/square root circuitry 212 is configured to receive the log output operand 222 from log circuitry 210. Inverse/square root circuitry 212 is configured to determine an inverse, determine a square root or determine an inverse square root of the log output operand 222 based, at least in part, on an inverse control input and based, at least in part, on a square root control input. In other words, the specific function of inverse/square root circuitry 212 may be selected based, at least in part, on the inverse control input and/or the square root control input. Inverse/square root circuitry 212 is thus configured to provide as output the fixed point intermediate operand 224.

Antilog circuitry 214 is configured to receive the intermediate operand 224 and to provide the unified output operand 226. Thus, unified output operand 226 is a 32 bit floating-point number corresponding to a base 2 antilogarithm of the intermediate operand 224.

Inverse/square root circuitry 212 includes an exclusive or ("XOR") gate 230, a right shift block 232 and a multiplexer ("MUX") 234. In one nonlimiting example, the right shift block 232 may be implemented as circuitry including, but not limited to, wiring, conductive traces, etc. In other words, in this nonlimiting example, the right shift block 232 may not be configured to store the operand. Inverse/square root circuitry 212 is configured to receive the inverse control input and the square root control input. The inverse control input and square root control input correspond to function selector control input(s) 105 of function selector circuitry 104 of FIG. 1. The XOR gate 230 is configured to toggle a sign bit of log output operand 222 if the inverse control input is set, i.e., corresponds to a logic one. The MUX 234 is configured to select between the log output operand 222 and a square root (i.e., right shift) of the log output operand 222 based, at least in part, on the square root control input. Table 1, as described herein, illustrates one example of function selector control input(s) 105 for inverse/square root circuitry 212.

Operation of log circuitry 210 and inverse/square root circuitry 212 may be performed in one clock cycle, e.g., a first clock cycle. In other words, the intermediate operand 224 may be determined in one clock cycle from receipt of the log input operand 220. Operation of antilog circuitry 214 may similarly be performed in one clock cycle, e.g., a second clock cycle. In other words, the antilog output operand 228 may be determined in one clock cycle from receipt of the intermediate operand 224.

Thus, example unified multifunction circuitry 202 is configured to receive a floating-point log input operand 220 and to transform the floating-point log input operand 220 to a corresponding fixed point log output operand 222 using a base 2 logarithm. The example unified multifunction circuitry 202 may be configured to perform one or more of an inverse and/or square root on the fixed point log output operand 222 to yield the fixed point intermediate operand 224. The example unified multifunction circuitry 202 is then configured to transform the fixed point intermediate operand 224 to a floating-point antilog output operand 228 using a base 2 antilogarithm. A significand (and mantissa) portion of the floating-point antilog output operand 228 may include a piecewise linear approximation of the base 2 antilogarithm of a fraction portion of the fixed point intermediate operand 224.

Generally, a precision of the piecewise linear approximation is related to a number of linear segments included in the piecewise linear approximation. Generally, increasing the number of segments corresponds to an improved (e.g., finer) precision and a corresponding reduced approximation error. Table 2 illustrates precision versus number of segments for a 32-bit floating-point number with a 23 bit mantissa. For example, a piecewise linear approximation that includes 8 segments corresponds to eight bits of precision. In another example, a piecewise linear approximation that includes 256 segments corresponds to 15 bits of precision.

TABLE 2

| Number of Segments | Most significant error bit location in 23 bit mantissa |
| --- | --- |
| 8 | 9 |
| 16 | 11 |
| 32 | 12 |
| 64 | 12 |
| 128 | 13 |
| 256 | 16 |
| 512 | 19 |
| 1024 | 21 |
| 1556 | 23 |

Each segment of a piecewise linear approximation may be further approximated by a respective sum of terms. In other words, a linear approximation may generally be specified by a slope and an intercept. A respective slope and a respective intercept of each segment may be further approximated by a sum of terms where each term includes a factor that is a negative power of 2, i.e., a power of $2^{-1}$. Such further approximation is configured to facilitate implementing the piecewise linear approximation of a base 2 logarithm and the piecewise linear approximation of the base 2 antilogarithm in circuitry. Utilizing terms that include factors that are negative powers of 2 is configured to reduce and/or minimize a size and/or complexity of the unified multifunction circuitry. For example, factors that are negative powers of 2 may be implemented and/or manipulated with bit shifting. Bit shifting may be implemented relatively efficiently with wiring and/or conductive traces as opposed to, for example, shift registers.

The number of segments and the number of terms are related to a target precision. Thus, the number of segments and the number of terms may be selected based, at least in part, on the target precision. A relatively finer precision (corresponding to a relatively smaller approximation error) may be associated with an increase in the number of segments and/or an increase in the number of terms. Increasing the number of segments and/or increasing the number of terms may be associated with relatively more complex circuitry. For example, in configurations that use multiplexers, a minimum number of multiplexers is related to a maximum number of terms.

Figure 3A:
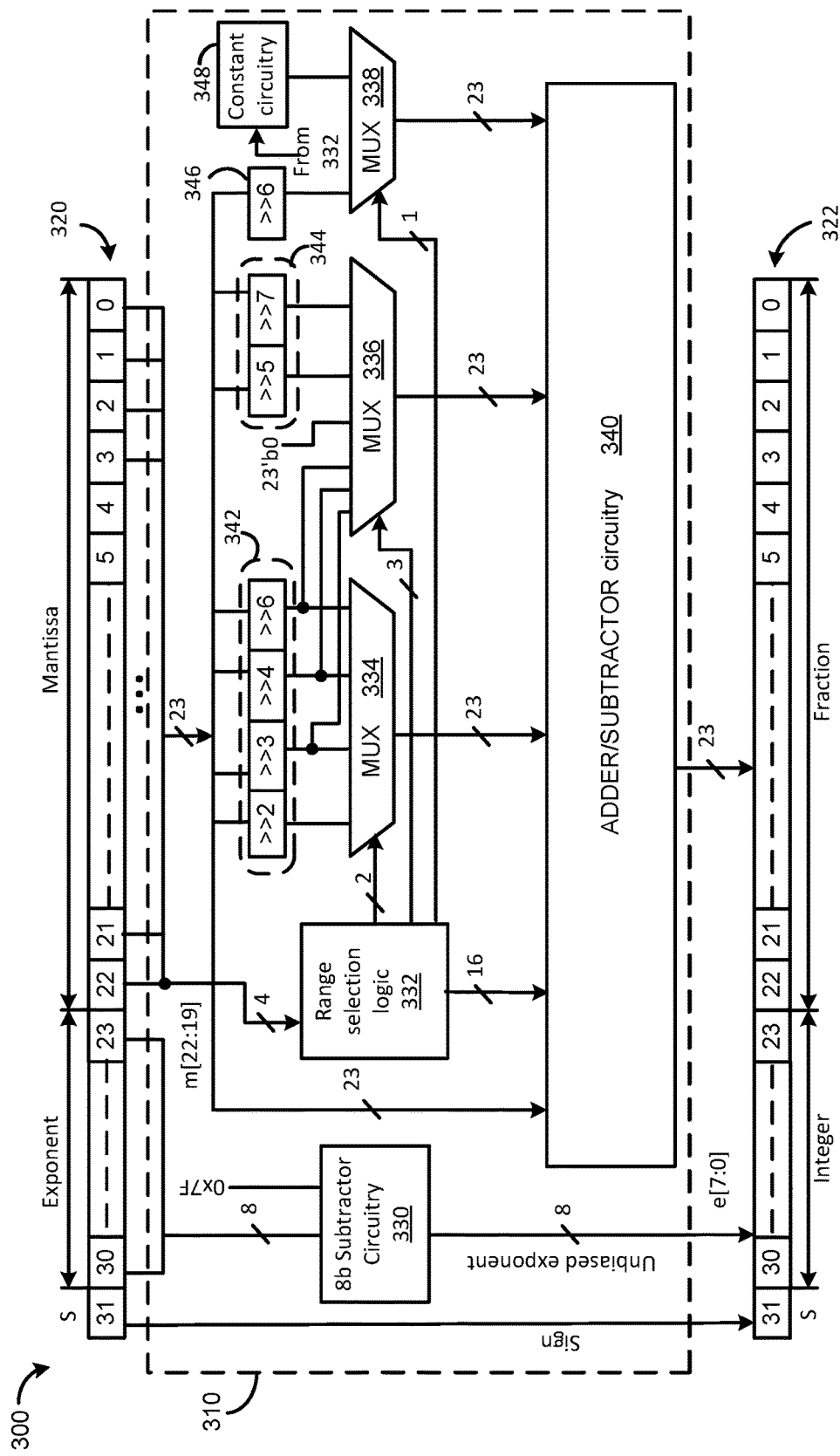
FIG. 3A is a functional block diagram of a subsystem that includes one example logarithm circuitry of the example unified multifunction circuitry of FIG. 2.

FIG. 3A is a functional block diagram of a subsystem 300 that includes one example logarithm circuitry 310. Logarithm circuitry 310 is one example of log circuitry 110 of FIG. 1 and/or 210 of FIG. 2. Logarithm circuitry 310 is configured to receive a log input operand 320 and to provide as output a log output operand 322. The log output operand 322 may then be output from a corresponding unified multifunction circuitry or provided to an inverse/square root circuitry (e.g., inverse/square root circuitry 112 and/or 212), as described herein.

In this example, the log input operand 320 corresponds to a single precision 32 bit floating-point number and the log output operand 322 corresponds to a 32 bit fixed point number. However, this disclosure is not limited in this regard. Example logarithm circuitry 310 is configured to perform a base 2 logarithm of a 32-bit floating-point number. In this example, performing the base 2 logarithm includes performing a 16 segment piecewise linear approximation of a base 2 logarithm of a 24 bit significand (i.e., 23 bit mantissa plus leading one).

Table 3 includes a number (16 in this example) of ranges of mantissa values (m) and corresponding linear approximations of the base 2 logarithms of each segment of the significand ($\log_2(m+1)$). Each range of mantissa values and corresponding linear approximation corresponds to a respective segment of the piecewise linear approximation of the base 2 logarithm of the significand. The mantissa is greater than or equal to zero and less than one. The base 2 logarithm of the significand is also greater than or equal to zero and less than one. The respective piecewise linear approximation for each segment includes a plurality of terms. The number of terms is related to the target precision, as described herein. Each term includes a respective factor that is a respective negative power of 2, i.e., a respective power of $2^{-1}$, as described herein.

TABLE 3

| Mantissa (m) | $\log_2(m+1)$ |
|---|---|
| $0 \le m < 0.0625$ | $m + \dfrac{m}{4} + \dfrac{m}{8} + \dfrac{m}{64}$ |
| $0.0625 \le m < 0.125$ | $m + \dfrac{m}{4} + \dfrac{m}{16} + \dfrac{1}{256} + \dfrac{1}{1024}$ |
| $0.125 \le m < 0.1875$ | $m + \dfrac{m}{4} + \dfrac{1}{64} - \dfrac{1}{512}$ |
| $0.1875 \le m < 0.25$ | $m + \dfrac{m}{8} + \dfrac{m}{16} + \dfrac{1}{64} + \dfrac{1}{128}$ |
| $0.25 \le m < 0.3125$ | $m + \dfrac{m}{8} + \dfrac{1}{32} + \dfrac{1}{128}$ |
| $0.3125 \le m < 0.375$ | $m + \dfrac{m}{16} + \dfrac{m}{128} + \dfrac{1}{16}$ |
| $0.375 \le m < 0.4375$ | $m + \dfrac{m}{64} + \dfrac{m}{128} + \dfrac{1}{16} + \dfrac{1}{128}$ |
| $0.4375 \le m < 0.5$ | $m - \dfrac{m}{64} + \dfrac{1}{16} + \dfrac{1}{32}$ |
| $0.5 \le m < 0.5625$ | $m - \dfrac{m}{16} + \dfrac{m}{128} + \dfrac{1}{8}$ |
| $0.5625 \le m < 0.625$ | $m - \dfrac{m}{8} + \dfrac{m}{32} + \dfrac{1}{8} + \dfrac{1}{128}$ |
| $0.625 \le m < 0.6875$ | $m - \dfrac{m}{8} + \dfrac{1}{8} + \dfrac{1}{32}$ |
| $0.6875 \le m < 0.75$ | $m - \dfrac{m}{8} - \dfrac{m}{32} + \dfrac{1}{8} + \dfrac{1}{16}$ |
| $0.75 \le m < 0.8125$ | $m - \dfrac{m}{4} + \dfrac{m}{16} + \dfrac{1}{8} + \dfrac{1}{16}$ |
| $0.8125 \le m < 0.875$ | $m - \dfrac{m}{4} + \dfrac{m}{32} + \dfrac{1}{4}$ |
| $0.875 \le m < 0.9375$ | $m - \dfrac{m}{4} + \dfrac{1}{4}$ |
| $0.9375 \le m < 1$ | $m - \dfrac{m}{4} - \dfrac{m}{64} + \dfrac{1}{4} + \dfrac{1}{64}$ |

Each linear approximation illustrated in Table 3 includes the mantissa (m) and at least one mantissa term (e.g., power of two fraction of the mantissa ($m/2^p$, where $p \ge 2$)). All of the linear approximations, except the first linear approximation corresponding to $0 \le m < 0.0625$, include at least one constant term (e.g., $1/2^q$, where $q \ge 2$). Thus, each mantissa term may be implemented by a number of right shifts of the mantissa with the number of right shifts corresponding to the power of two, p, of the respective mantissa term. Similarly, each constant term may be implemented by a number of right shifts of a one bit with the number of right shifts corresponding to the power of two, q, of the respective constant term.

Thus, example logarithm circuitry 310 is configured to determine a log output operand that corresponds to a base 2 logarithm of a 32-bit input operand. Each log output operand includes a selected piecewise linear approximation of a base 2 logarithm of a 23-bit mantissa (24-bit significand). The selected piecewise linear approximation may be selected from the 16 segments illustrated in Table 3. Example logarithm circuitry 310 includes 8 bit subtractor circuitry 330, range selection logic 332, a plurality of multiplexers 334, 336, 338, adder/subtractor circuitry 340, a plurality of shift blocks 342, 344, 346 and a constant block 348.

Example logarithm circuitry 310 is configured to receive a 32 bit floating point input operand 320 and to provide as output a 32-bit fixed point log output operand 322. The input operand 320 includes a sign bit ($b_{31}$), a biased exponent ($b_{30}$:$b_{23}$) and a mantissa ($b_{22}$:$b_0$). The log output operand 322 includes a sign bit ($b_{31}$), an integer portion ($b_{30}$:$b_{23}$) and a fraction portion ($b_{22}$:$b_0$). The sign bit of the log output operand 322 corresponds to the sign bit of the input operand 320. The eight bit subtractor circuitry 330 is configured to receive the biased exponent and a bias value (0x7F=$127_{10}$, in this example). The 8 bit subtractor circuitry 330 is configured to subtract the bias value from the biased exponent to yield an unbiased exponent. The unbiased exponent may then correspond to the integer portion (bits $b_{30}$:$b_{23}$) of the log output operand 322.

Range selection logic 332 is configured to receive a number of most significant bits of the mantissa of the log input operand 320. The number of most significant bits is related to the number of segments in the piecewise linear approximation. In this example, the number of segments is 16, thus, the number of most significant bits is 4 (i.e., $2^4$=16), corresponding to mantissa bits 22:19. Range selection logic 332 is configured to select appropriate multiplexer inputs to couple to a multiplexer output for provision to adder/subtractor circuitry 340. In other words, range selection logic 332 is configured to select the appropriate segment of the piecewise linear approximation based, at least in part, on the most significant bits of the mantissa. It may be appreciated that the range of values for the most significant bits corresponds to the number of segments.

Range selection logic 332 is configured to provide selector control inputs to multiplexers 334, 336 and 338 and to constant circuitry 348. The selector control inputs are related to the received most significant bits. In other words, the received most significant bits are configured to identify the appropriate piecewise linear approximation segment. Range selection logic 332 may then be configured to provide corresponding selector control inputs to multiplexers 334, 336 and 338, based, at least in part, on the received most significant bits.

The number of multiplexers corresponds to a maximum number of terms in the piecewise linear approximation segments that contain nonzero powers of $2^{-1}$. For example, for a first segment with a mantissa range of $0 \leq m < 0.0625$, the number of terms is three.

At least one input of each multiplexer 334, 336, 338 is coupled to a right shift block. An input to multiplexer 336 is coupled to a constant zero (e.g., 23'b0). An input to multiplexer 338 is coupled to a constant circuitry block 348, as will be described in more detail below. For example, multiplexer 334 is coupled to a plurality 342 of right shift blocks, multiplexer 336 is coupled to a portion of right shift blocks 342 and to right shift blocks 344 and multiplexer 338 is coupled to right shift block 346 and the constant circuitry 348. Right shift blocks 342 includes a right shift by 2, a right shift by 3, a right shift by 4 and a right shift by 6. Right shift blocks 344 include a right shift by 5 and a right shift by 7. Right shift block 346 includes a right shift by 6. The right shift blocks 342, 344, 346 may be implemented in circuitry, e.g., wiring and/or conductive traces, as described herein.

Each right shift block is configured to receive the 23 bit mantissa of the input operand 320. The numbers in the right shift blocks correspond to the negative power of two (e.g., $m/2^p$, where $p \geq 2$) for each factor in each mantissa term. For example, right shift block 346 corresponds to a right shift by 6 bits, i.e., $p=6$ and the mantissa, m, is divided by $2^6=64$.

The multiplexers 334, 336, 338 and corresponding inputs are configured so that only one input to each multiplexer may be selected for a given piecewise linear approximation segment. The constant zero input to multiplexer 336 is configured to accommodate linear approximation segments that have fewer than two or three mantissa terms (e.g., mantissa range $0.25 \leq m < 0.3125$).

Figure 3B:
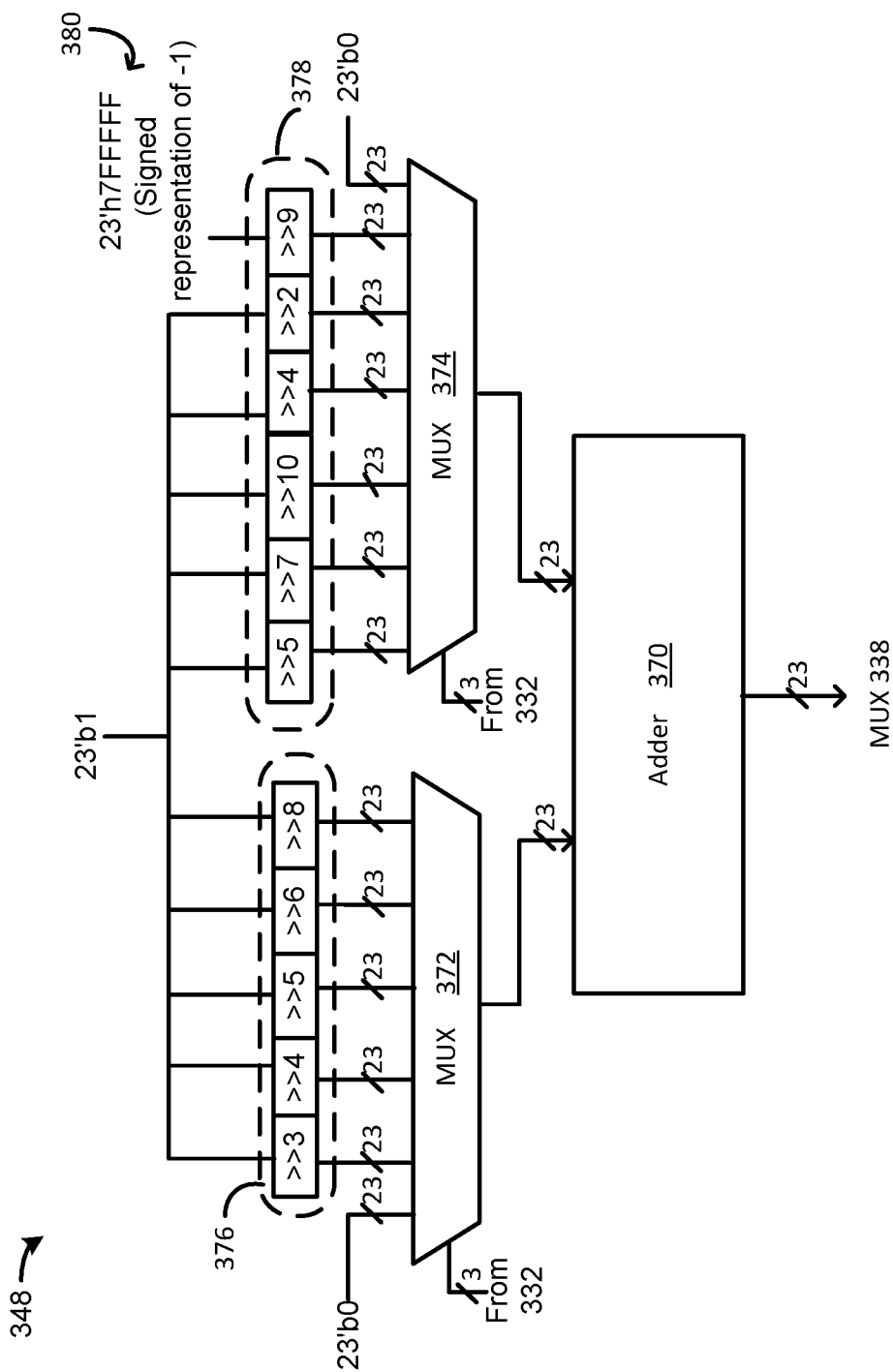
FIG. 3B is a functional block diagram of one example constant block circuitry of FIG. 3A.

FIG. 3B is a functional block diagram of one example constant block circuitry 348 of FIG. 3A. The following may be best understood when FIGS. 3A and 3B are considered together. The constant block circuitry 348 is configured to represent the constant terms in the piecewise linear approximation segments. Constant block circuitry 348 includes in adder 370, two multiplexers 372, 374 and two groups 376, 378 of right shift blocks. Each right shift block in the groups 376, 378 of right shift blocks is coupled to a one bit (23'b1) except a right shift by 9 block in group 378. The right shift by 9 is coupled to a 23 bit signed representation 380 of minus one (23'h7FFFFF). The negative one right shifted by nine represents the −1/512 term in the segment for the mantissa in the range $0.125 \leq m < 0.1875$, i.e., $-2^{-9} = -1/512$. The multiplexers 372, 374 are configured to receive control (i.e., select) inputs from range selection logic 332 of FIG. 3A. A respective output of each multiplexer 372, 374 is input to adder 370. An output of adder 370 is input to multiplexer 338. Thus, constant block circuitry 348 is configured to provide the constant terms in the equations shown in Table 3.

Thus, range selection logic 332 is configured to provide selector control inputs to multiplexers 334, 336, 338 to select outputs of right shift blocks 342, 344, 346 and/or constant block 348 for coupling to adder/subtractor circuitry 340. Adder/subtractor circuitry 340 (of FIG. 3A) is configured to receive the 23 bit mantissa and the 23 bit outputs of multiplexers 334, 336, 338. Adder/subtractor circuitry 340 is configured to add or subtract each term as indicated by the piecewise linear approximation segments of Table 3. Operation of adder/subtractor circuitry 340 may be controlled by range selection logic 332. For example, adder/subtractor circuitry 340 may be configured to receive a plurality, e.g., 16, control bits from range selection logic 332.

Figure 3C:
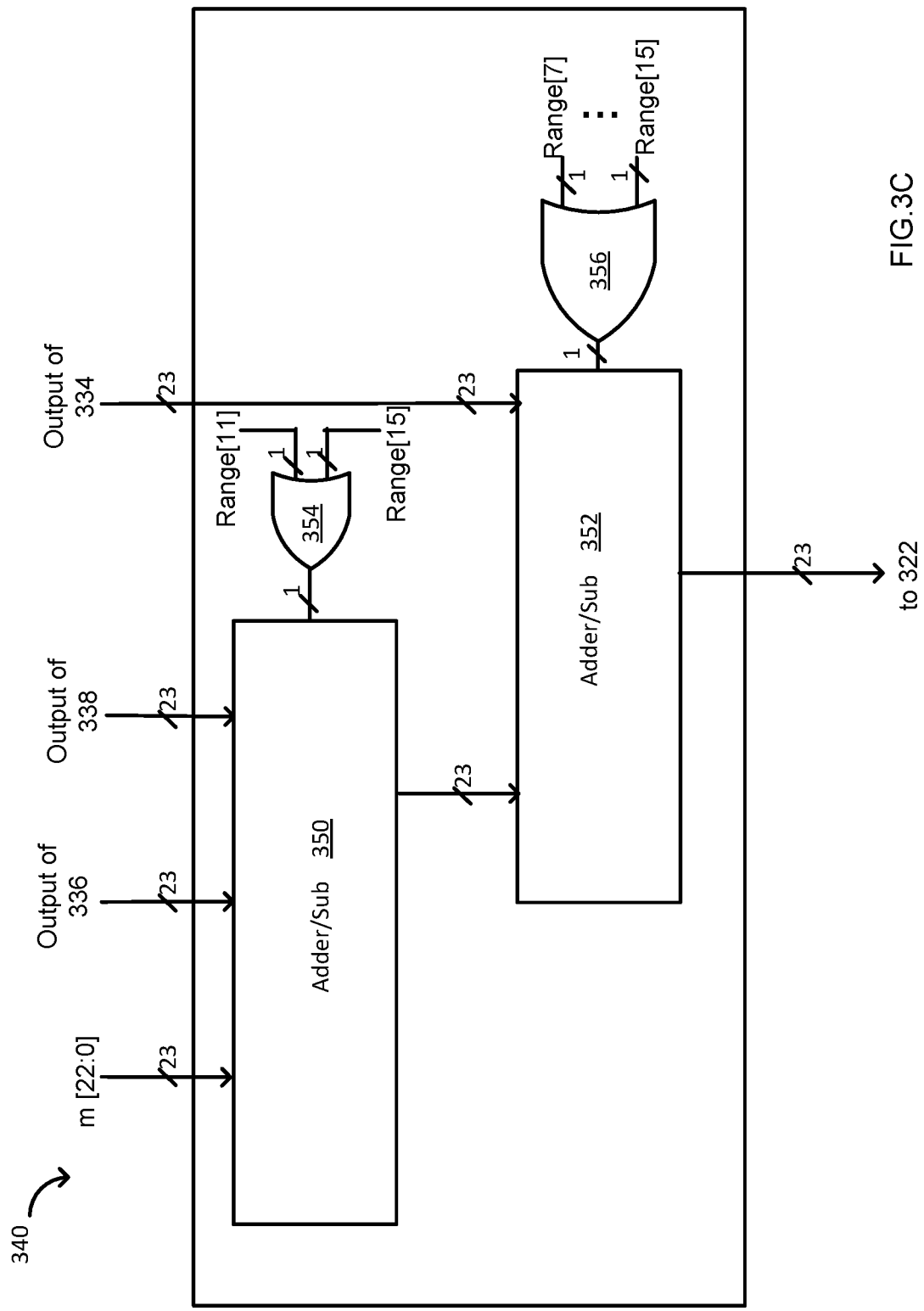
FIG. 3C is a functional block diagram of one example adder/subtractor circuitry of FIG. 3A.

FIG. 3C is a functional block diagram of one example adder/subtractor circuitry 340 of FIG. 3A. The following description may be best understood when considering FIGS. 3A and 3C together. Example adder/subtractor circuitry 340 includes two adder/subtractors 350, 352 and two OR gates 354, 356. A first adder/subtractor 350 is coupled, at its inputs, to the 23 bit mantissa and the outputs of multiplexers 336 and 338 and to an output of OR gate 354 as a control input. A second adder/subtractor 352 is coupled, at its inputs, to an output of the first adder/subtractor 350 and an output of multiplexer 334, and an output of OR gate 356 as a control input. An output of the second adder/subtractor corresponds to the log output operand. The first OR gate 354 has two inputs that are coupled to two range bits (Range [11], Range [15]), as will be described in more detail below. The second OR gate 356 has nine inputs that are coupled to range bits (Range [7] through Range [15]).

Range selection logic 332 is configured to generate 16 bits (i.e., 4 MSBs), with each bit corresponding to one respective value of the four MSBs that are input to range selection logic 332. For example, bit 7 (i.e., Range [7]) corresponds to $0111_2$. The OR gates 354, 356 are configured to output a one if any one or more inputs is a one.

For example, if the output of OR gate 354 is a 1, i.e., Range [11] or Range [15] is equal to a 1, then the first adder/subtractor 350 is configured to subtract the output of multiplexer 336 from a sum of the mantissa and the output of multiplexer 338. If the output of the OR gate 354 is a zero, then the first adder/subtractor 350 is configured to add the output of multiplexer 336 to a sum of the mantissa and the output of multiplexer 338. Range [11] corresponds to the range of mantissa values in Table 3 of $0.6875 \leq m < 0.75$. Range [15] corresponds to the range of mantissa values in Table 3 of $0.9375 \leq m < 1$. Similarly, if the output of OR gate 356 is a 1, i.e., any one or more of Range [7] through Range [15] is equal to a 1, then the second adder/subtractor 352 is configured to subtract the output of multiplexer 334 from the output of first adder/subtractor 350.

Thus, adder/subtractor 340 is configured to facilitate implementing the equations of Table 3. An output of adder/subtractor circuitry 340 may then correspond to the fraction portion of the log output operand 322.

Thus, logarithm circuitry 310 is configured to receive input operand 320 (e.g., log input operand), to determine a base 2 logarithm of the input operand 320 and to provide as output the log output operand 322. The log output operand includes a piecewise linear approximation of the base 2 logarithm of the significand of the input operand 320. The 24-bit significand corresponds to the 23-bit mantissa of the input operand 320 plus a leading one, as described herein. The input operand may correspond to a unified input operand or a log input operand.

Figure 4A:
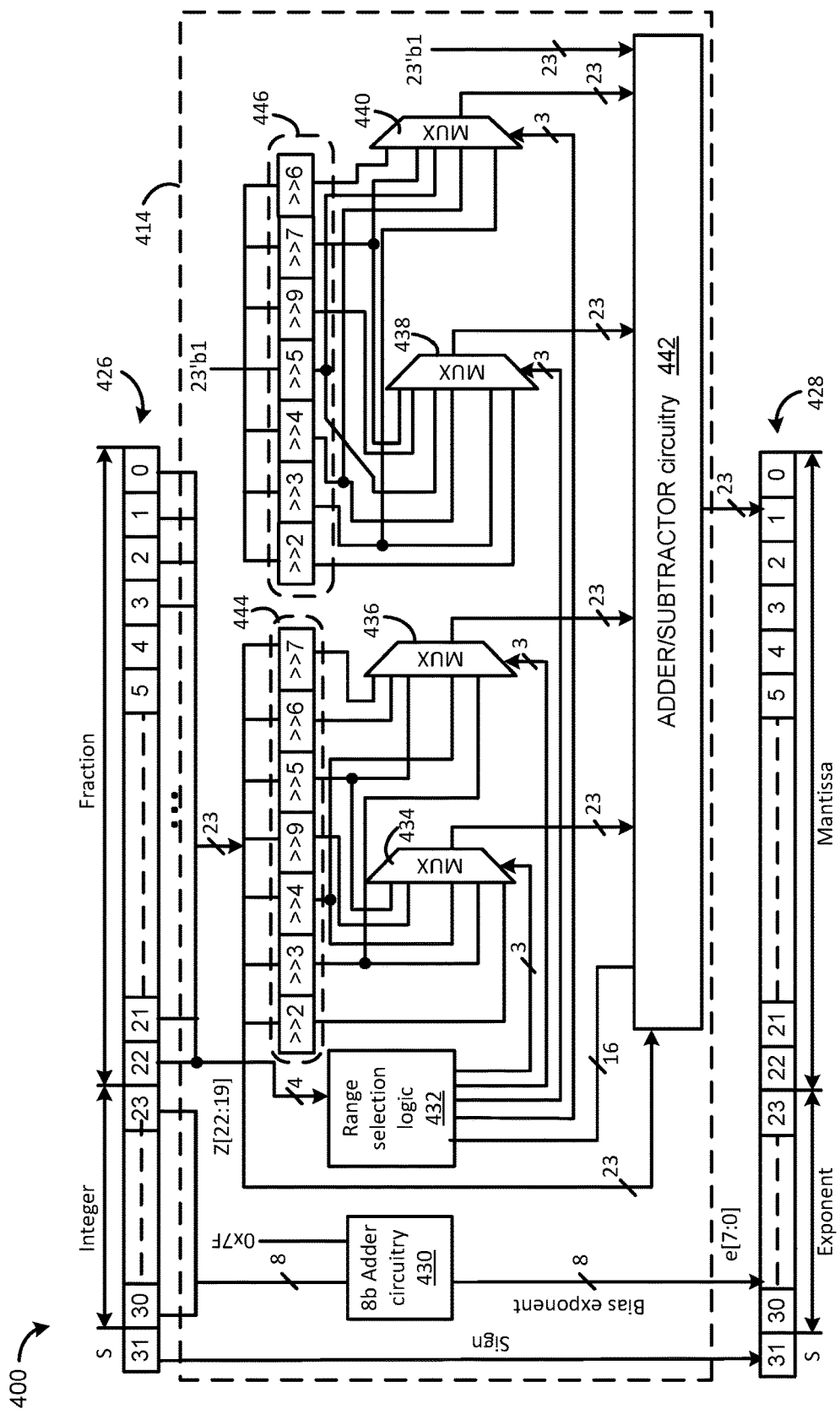
FIG. 4A is a functional block diagram of a subsystem that includes one example antilogarithm circuitry of the example unified multifunction circuitry of FIG. 2.

FIG. 4A is a functional block diagram of a subsystem 400 that includes one example antilogarithm circuitry 414 of the example unified multifunction circuitry of FIG. 2. Antilogarithm circuitry 414 is one example of antilog circuitry 214 of FIG. 2. Antilogarithm circuitry 414 is configured to receive a selected input operand 426 that may correspond to an intermediate operand or an antilog input operand. Antilogarithm circuitry 414 is configured to provide as output an antilog output operand 428. The antilog output operand 428 may be related to an antilog input operand or an intermediate operand, as described herein. In this example, the selected input operand 426 corresponds to a 32 bit fixed point number and the antilog output operand 428 corresponds to a single precision 32 bit floating point number. However, this disclosure is not limited in this regard. Example antilogarithm circuitry 414 is configured to perform a base 2 antilogarithm of a 32 bit fixed point number. In this example, performing the base 2 antilogarithm includes performing a 16 segment piecewise linear approximation of a base 2 antilogarithm of a 23 bit fraction (i.e., fraction portion of an intermediate operand).

Table 4 includes a number (16 in this example) of ranges of fraction values ($\eta$) and corresponding linear approximations of the base 2 antilogarithms of each segment of the fraction portion of the selected input operand 426. Each range of fraction values and corresponding linear approximation corresponds to a respective segment of the piecewise linear approximation of the base 2 antilogarithm of the fraction. The fraction is greater than or equal to zero and less than one. The base 2 antilogarithm of the fraction is greater than or equal to one and less than two. The respective piecewise linear approximation for each segment includes a plurality of terms. The number of terms is related to the target precision, as described herein. Each term includes a respective factor that is a respective negative power of 2, as described herein.

TABLE 4

| $\eta$ | $2^\eta$ |
|---|---|
| $0 \le \eta < 0.0625$ | $\eta - \frac{\eta}{4} - \frac{\eta}{32} + 1$ |
| $0.0625 \le \eta < 0.125$ | $\eta - \frac{\eta}{4} - \frac{\eta}{64} + 1 - \frac{1}{512}$ |
| $0.125 \le \eta < 0.1875$ | $\eta - \frac{\eta}{4} - \frac{\eta}{64} + 1 - \frac{1}{128}$ |
| $0.1875 \le \eta < 0.25$ | $\eta - \frac{\eta}{8} - \frac{\eta}{16} + 1 - \frac{1}{64}$ |
| $0.25 \le \eta < 0.3125$ | $\eta - \frac{\eta}{8} - \frac{\eta}{32} + 1 - \frac{1}{32} + \frac{1}{128}$ |
| $0.3125 \le \eta < 0.375$ | $\eta - \frac{\eta}{8} + 1 - \frac{1}{32}$ |
| $0.375 \le \eta < 0.4375$ | $\eta - \frac{\eta}{16} - \frac{\eta}{64} + 1 - \frac{1}{32} - \frac{1}{64}$ |
| $0.4375 \le \eta < 0.5$ | $\eta - \frac{\eta}{32} - \frac{\eta}{64} + 1 - \frac{1}{16}$ |

TABLE 4-continued

| $\eta$ | $2^\eta$ |
|---|---|
| $0.5 \le \eta < 0.5625$ | $\eta + \frac{\eta}{512} + 1 - \frac{1}{8} + \frac{1}{32}$ |
| $0.5625 \le \eta < 0.625$ | $\eta + \frac{\eta}{16} - \frac{\eta}{64} + 1 - \frac{1}{8} + \frac{1}{128}$ |
| $0.625 \le \eta < 0.6875$ | $\eta + \frac{\eta}{16} + \frac{\eta}{32} + 1 - \frac{1}{8} - \frac{1}{64}$ |
| $0.6875 \le \eta < 0.75$ | $\eta + \frac{\eta}{8} - \frac{\eta}{64} + 1 - \frac{1}{4} + \frac{1}{16}$ |
| $0.75 \le \eta < 0.8125$ | $\eta + \frac{\eta}{8} - \frac{\eta}{16} + 1 - \frac{1}{4} + \frac{1}{32}$ |
| $0.8125 \le \eta < 0.875$ | $\eta + \frac{\eta}{4} - \frac{\eta}{128} + 1 - \frac{1}{4} - \frac{1}{128}$ |
| $0.875 \le \eta < 0.9375$ | $\eta + \frac{\eta}{4} + \frac{\eta}{32} + 1 - \frac{1}{4} - \frac{1}{16}$ |
| $0.9375 \le \eta < 1$ | $\eta + \frac{\eta}{4} + \frac{\eta}{8} + 1 - \frac{1}{4} - \frac{1}{8}$ |

Each linear approximation illustrated in Table 4 includes the intermediate fraction ($\eta$), an added one term, at least one fraction term (e.g. a negative power of two factor multiplying the intermediate fraction ($\eta/2^p$, where p≥2)) and at least one constant term (e.g., $1/2^q$, where q≥2). Thus, similar to each mantissa term in Table 3, each fraction term may be implemented by a number of right shifts of the intermediate fraction with the number of right shifts corresponding to the power of two, p, of the respective fraction term. Similarly, each constant term may be implemented by a number of right shifts of a one bit with a number of right shifts corresponding to the power of two, q, of the respective constant term.

Thus, example antilogarithm circuitry 414 is configured to determine an antilog output operand that corresponds to a base 2 antilogarithm of a 32-bit selected input operand 426 that may correspond to an intermediate operand or an antilog input operand. The antilog output operand 428 may be related to an antilog input operand or an intermediate operand, as described herein. The antilog output operand 428 includes a selected piecewise linear approximation of a base 2 antilogarithm of a 23 bit fraction. The selected piecewise linear approximation may be selected from the 16 segments illustrated in Table 4. Example antilogarithm circuitry 414 includes 8 bit adder circuitry 430, range selection logic 432, a plurality of multiplexers 434, 436, 438, 440, adder/subtractor circuitry 442 and a plurality of shift blocks 444, 446.

Example antilogarithm circuitry 414 is configured to receive a 32 bit fixed point selected input operand 426 that may correspond to an intermediate operand or an antilog input operand and to provide as output a 32-bit floating point antilog output operand 428. The selected input operand 426 includes a sign bit ($b_{31}$), an integer portion ($b_{30}$:$b_{23}$) and a fraction portion ($b_{22}$:$b_0$). The antilog output operand 428 includes a sign bit ($b_{31}$), a biased exponent ($b_{30}$:$b_{23}$) and a mantissa ($b_{22}$:$b_0$). The sign bit of the antilog output operand 428 corresponds to the sign bit of the selected input operand 426. The 8 bit adder circuitry 430 is configured to receive the integer portion and a bias value (0x7F=$127_{10}$, in this example). The 8 bit adder circuitry 430 is configured to add the bias value to the integer to yield a biased exponent. The biased exponent may then correspond to the exponent (bits $b_{30}$:$b_{23}$) of the antilog output operand 428.

Range selection logic 432 is configured to receive a number of most significant bits of the fraction of the intermediate operand 424. Operation of range selection logic 432 is similar to operation of range selection logic 332 of FIG. 3, as described herein. Range selection logic 432 is configured to select the appropriate multiplexer inputs to couple to a multiplexer output for provision to adder/subtractor circuitry 442. In other words, range selection logic 432 is configured to select the appropriate segment of a piece wide linear approximation based, at least in part, on the most significant bits of the fraction portion.

Range selection logic 432 is configured to provide selector control inputs to multiplexers 434, 436, 438, 440. The selector control inputs are related to the received most significant bits. Range selection logic 432 may then be configured to provide corresponding selector control inputs to multiplexers 434, 436, 438, 440, based, at least in part, on the received most significant bits. Similar to the logarithm circuitry 310 of FIG. 3, the number of multiplexers corresponds to a maximum number of terms in the piecewise linear approximation segments that contain nonzero powers of $2^{-1}$. The multiplexers 434, 436, 438, 440 and corresponding inputs are configured so that only one input to each multiplexer may be selected for a given piecewise linear approximation segment.

The inputs of multiplexers 434 and 436 are coupled to at least some of the right shift blocks included in right shift blocks 444. Inputs to right shift blocks 444 are coupled to the 23 bit fraction portion of selected input operand 426. The inputs of multiplexers 438 and 440 are coupled to at least some of the right shift blocks included in right shift blocks 446. The inputs to right shift blocks 446 are coupled to a 23 bit input, 23'b1, with a least significant bit equal to 1 and the other 22 bits equal to 0. Right shift blocks 444 includes right shifts by 2, 3, 4, 9, 5, 6 and 7. The numbers in the right shift blocks 444 correspond to the negative power of two (e.g., $\eta/2^p$, where p≥2) for each factor in each intermediate fraction term. Right shift blocks 446 includes right shifts by 2, 3, 4, 5, 9, 7 and 6. The numbers in the right shift blocks 446 correspond to the negative power of two (e.g., $1/2^q$, where q≥2) for each constant term. The right shift blocks 444, 446 may be implemented in circuitry, e.g., wiring and/or conductive traces, as described herein.

Thus, right shift blocks 444 and multiplexers 434, 436 are configured to provide intermediate fraction terms of a selected piecewise linear approximation segment to adder/subtractor circuitry 442. Similarly, right shift blocks 446 and multiplexers 438, 440 are configured to provide selected constant terms of a selected piecewise linear approximation segment to adder/subtractor circuitry 442.

Thus, range selection logic 432 is configured to provide selector control inputs to multiplexers 434, 436, 438, 442 select outputs of right shift blocks 444, 446 for coupling to adder/subtractor circuitry 442.

Adder/subtractor circuitry 442 is configured to receive the 23 bit intermediate fraction, the outputs of multiplexers 434, 436, 438, 440 and a 23 bit constant with a least significant bit equal to 1 and all other bits equal to 0. The 23 bit constant corresponds to the added 1 in the piecewise linear approximation segments corresponding to the base 2 anti-logarithm of the fraction portion of the selected input operand 426. This added 1 further corresponds to the leading one associated with the mantissa of a significand of a floating-point number, as described herein.

Adder/subtractor circuitry 442 is configured to add or subtract each term as indicated by the piecewise linear approximation segments of Table 4. Operation of adder/subtractor circuitry 442 may be controlled, for example, by range selection logic 432. An output of adder/subtractor circuitry 442 may then correspond to the significand (and the mantissa portion) of an antilog output operand 428, as described herein.

Figure 4B:
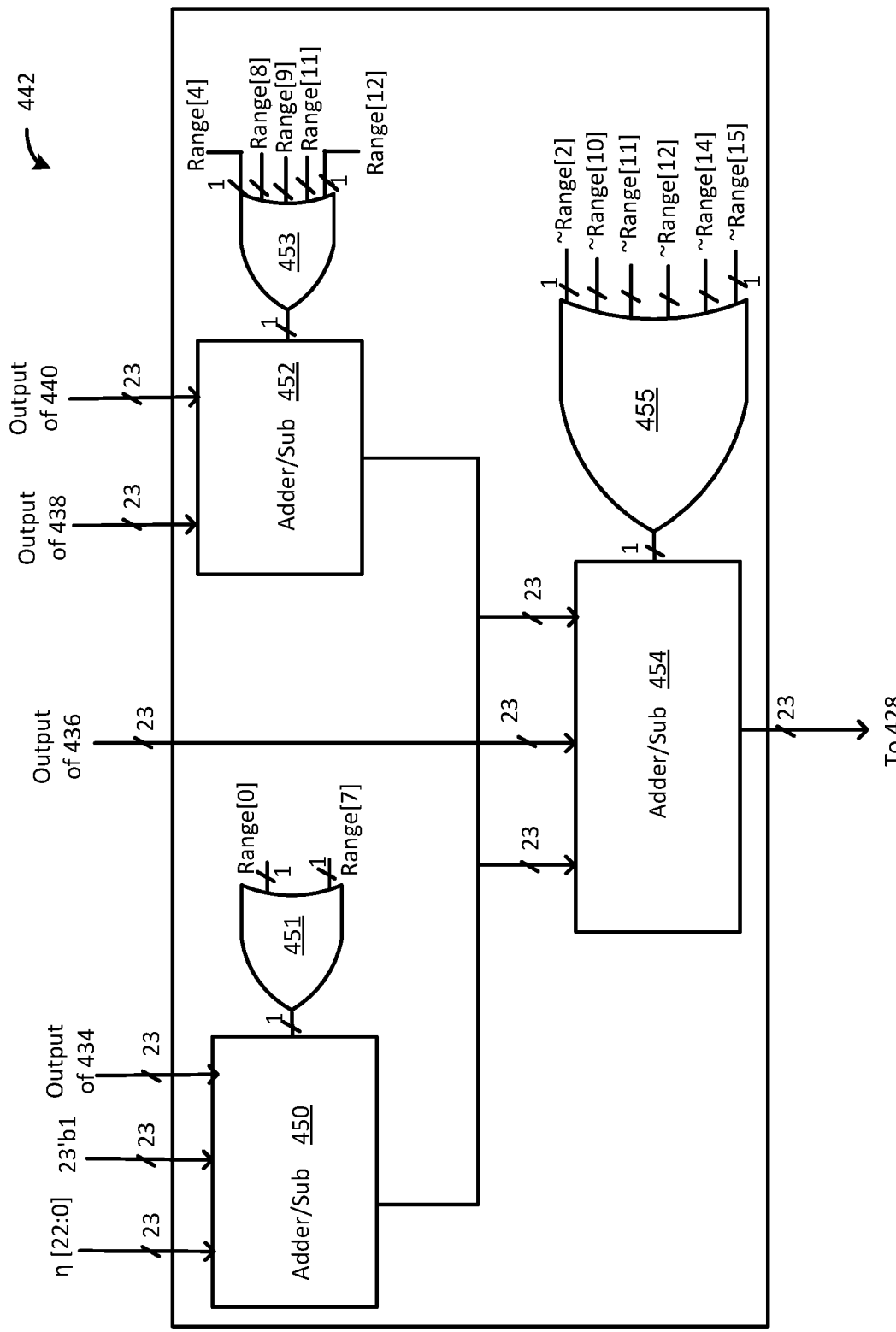
FIG. 4B is a functional block diagram of one example adder/subtractor circuitry of FIG. 4A.

FIG. 4B is a functional block diagram of one example of adder/subtractor circuitry 442 of FIG. 4A. the following description may be best understood when considering FIGS. 4A and 4B together. Example adder/subtractor circuitry 442 includes three adder/subtracter's 450, 452, 454 and three OR Gates 451, 453, 455. A first adder/subtractor 450 is coupled, at its inputs, to the 23 bit fraction, a one bit (i.e., a 23 bit value with the least significant bit equal to one), an output of multiplexer 434 and to an output of OR gate 451 as a control input. A second adder/subtractor 452 is coupled, at its inputs, to the outputs of multiplexers 438 and 440 and to an output of OR gate 453 as a control input. A third adder/subtractor 454 is coupled, at its inputs, to outputs of the first and second adder/subtractors 450, 452, to an output of multiplexer 436 and an output of OR gate 455 as a control input. An output of the third adder/subtracter corresponds to the antilog output operand 428. The first OR gate 451 has two inputs that are coupled to two range bits (Range [0], Range [7]). The second OR gate 453 has five inputs that are coupled to respective range bits (Range [4], Range [8], Range [9], Range [11], Range [12]). The third OR gate 455 has six inputs that are coupled to inverted range bits (~Range [2], ~Range [10], ~Range [11], ~Range [12], ~Range [14], ~Range [15], where ~ corresponds to inverted).

Similar to range selection logic 332 of FIG. 3A, range selection logic 432 is configured to generate 16 bits (i.e., 4 MSBs), with each bit corresponding to one respective value of the four MSBs that are input to range selection logic 432. The first and second OR gates 451, 453 are configured to output a one if any one or more range bits is equal to one. In contrast, the third OR gate 455 is configured to output a one if anyone or more of the range bits that are coupled to the third OR gate 455 are equal to zero. Operation of the range bits and the fraction values in Table 4 is similar to operation of the range bits and the mantissa values in Table 3 with respect to range selection logic 332, as described herein.

For example, if the output of OR gate 451 is a 1, i.e., Range [0] or Range [7] is equal to a 1, then the first adder/subtractor 450 is configured to subtract the output of multiplexer 434 from a sum of the fraction plus the one bit. If the output of the OR gate 451 is zero, then the first adder/subtractor 450 is configured to add the output of multiplexer 434 to a sum of the fraction plus the one bit. In another example if the output of OR gate 453 is equal to a 1, then the second adder/subtractor 452 is configured to subtract the output of multiplexer 440 from the output of multiplexer 438. If the output of the OR gate 453 is a zero, then the second adder/subtractor 452 is configured to add the output of multiplexer 440 to the output of multiplexer 438. In another example, if the output of the third OR gate 455 is equal to a 1, then the third adder/subtractor 454 is configured to subtract the output of the second adder/subtractor 452 and the output of multiplexer 436 from the output of the first adder/subtractor 450. If the output of the third OR gate 455 is equal to a zero, then the third adder/subtractor 454 is configured to subtract the output of the second adder/subtractor 452 from a sum of the output of the first adder/subtractor 450 and the output of multiplexer 436.

Thus, adder/subtractor and 442 is configured to facilitate implementing the equations of Table 4. An output of adder/subtractor circuitry 432 may then correspond to the mantissa portion of the antilog output operand 428.

Thus, antilogarithm circuitry 414 is configured to receive selected input operand 426, to determine a base 2 antilogarithm of the selected input operand 426 and to provide as output the antilog output operand 428. Selected input operand 426 may correspond to an intermediate operand or an antilog input operand. The output operand includes a piecewise linear approximation of the base 2 antilogarithm of the fraction portion of the selected input operand 426. In this example, the selected input operand 426 is a 32 bit fixed point number and the output operand is a 32-bit floating-point number.

Thus, a unified multifunction circuitry, consistent with the present disclosure, may receive a floating-point number and may then transform the floating-point number to a corresponding fixed point number using a base 2 logarithm. A fraction portion of the fixed point number is configured to include a piecewise linear approximation of the base 2 logarithm of a significand of the floating-point number. The unified multifunction circuitry may be configured to perform one or more arithmetic operations (e.g., inverse and/or square root) on the fixed point number to yield a fixed point intermediate operand. The unified multifunction circuitry may then transform the fixed point intermediate operand to an output floating-point number using a base 2 antilogarithm. A significand (and mantissa) portion of the output floating-point number is configured to include a piecewise linear approximation of the base 2 antilogarithm of a fraction portion of the fixed point intermediate operand.

A precision of a piecewise linear approximation is related to a number of segments included in a range of the significand and/or a range of the fraction portion. Each piecewise linear approximation may be further approximated by a plurality of sums of terms where each sum of terms corresponds to a respective slope and a respective intercept of a respective segment. Each term is configured to include a factor that is a negative power of 2. The terms may thus be implemented by right shifting binary bits. A complexity of the unified multifunction circuitry is related to the number of segments and the number of terms associated with each segment, as described herein.

FIG. 5A is a flowchart 500 of unified multifunction circuitry operations according to various embodiments of the present disclosure. In particular, the flowchart 500 illustrates utilizing piecewise linear approximations of a base 2 logarithm and a base 2 and antilogarithm to determine an antilog output operand. The operations may be performed, for example, by unified multifunction circuitry 102 of FIG. 1, unified multifunction circuitry 202 of FIG. 2, log circuitry 310 of FIG. 3 and/or antilog circuitry 414 of FIG. 4.

Operations of this embodiment may begin with receiving a log input operand at operation 502. Operation 504 includes determining a log output operand corresponding to a base 2 logarithm of the log input operand. The log output operand includes a piecewise linear approximation of a base 2 logarithm of a significand of the log input operand. Operation 506 includes determining a selected input operand. Operation 508 includes determining an antilog output operand corresponding to a base 2 antilogarithm of the selected input operand. The antilog output operand may include a piecewise linear approximation of a base 2 antilogarithm of a fraction of the selected input operand. The antilog output operand may be provided as output at operation 510.

FIG. 5B is another flowchart 550 of unified multifunction circuitry operations according to various embodiments of the present disclosure. In particular, the flowchart 550 illustrates utilizing piecewise linear approximations of a base 2 logarithm and a base 2 and antilogarithm to determine an antilog output operand. The operations may be performed, for example, by unified multifunction circuitry 102 of FIG. 1, unified multifunction circuitry 202 of FIG. 2, log circuitry 310 of FIG. 3 and/or antilog circuitry 414 of FIG. 4.

Operations of this embodiment may begin with receiving a log input operand at operation 552. Operation 554 includes determining a log output operand corresponding to a base 2 logarithm of the log input operand. The log output operand includes a piecewise linear approximation of a base 2 logarithm of a significand of the log input operand. Operation 556 includes determining an intermediate operand based, at least in part, on a function selector control input. For example, the function selector control input may be configured to select do nothing, perform an inverse operation, perform a square root operation or perform an inverse square root operation on the log output operand. Operation 558 includes determining an antilog output operand corresponding to a base 2 antilogarithm of the intermediate operand. The antilog output operand may include a piecewise linear approximation of a base 2 antilogarithm of a fraction of the intermediate operand. The antilog output operand may be provided as output at operation 560.

While the flowcharts of FIGS. 5A and 5B illustrates operations according various embodiments, it is to be understood that not all of the operations depicted in FIGS. 5A and 5B are necessary for other embodiments. In addition, it is fully contemplated herein that in other embodiments of the present disclosure, the operations depicted in FIGS. 5A and/or 5B and/or other operations described herein may be combined in a manner not specifically shown in any of the drawings, and such embodiments may include less or more operations than are illustrated in FIGS. 5A and 5B. Thus, claims directed to features and/or operations that are not exactly shown in one drawing are deemed within the scope and content of the present disclosure.

The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6B:
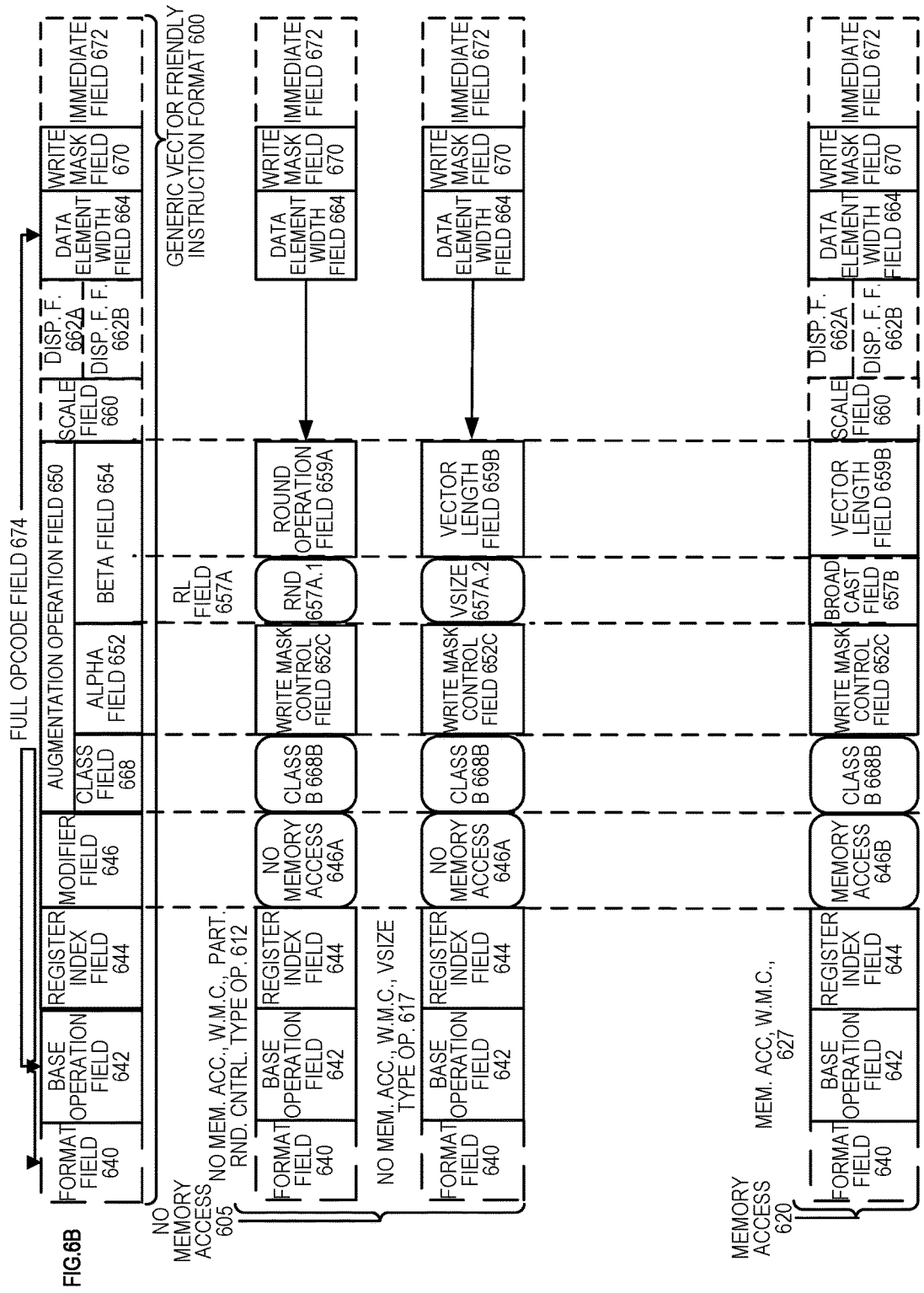

FIGS. 6A-6B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}$*index+base).

Displacement Field 662A—its content is used as part of memory address generation (e.g., for address generation that uses $2^{scale}$*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the invention where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the invention where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the invention. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0×62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]-R), EVEX.X bit field (EVEX byte 1, bit [6]-X), and 657BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]-mmmm)—its content encodes an implied leading opcode byte (0F, 0F 38, or 0F 3).

Data element width field 664 (EVEX byte 2, bit [7]-W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]-U)—If EVEX.0=0, it indicates class A or EVEX.U0; if EVEX.0=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the invention. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the invention. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
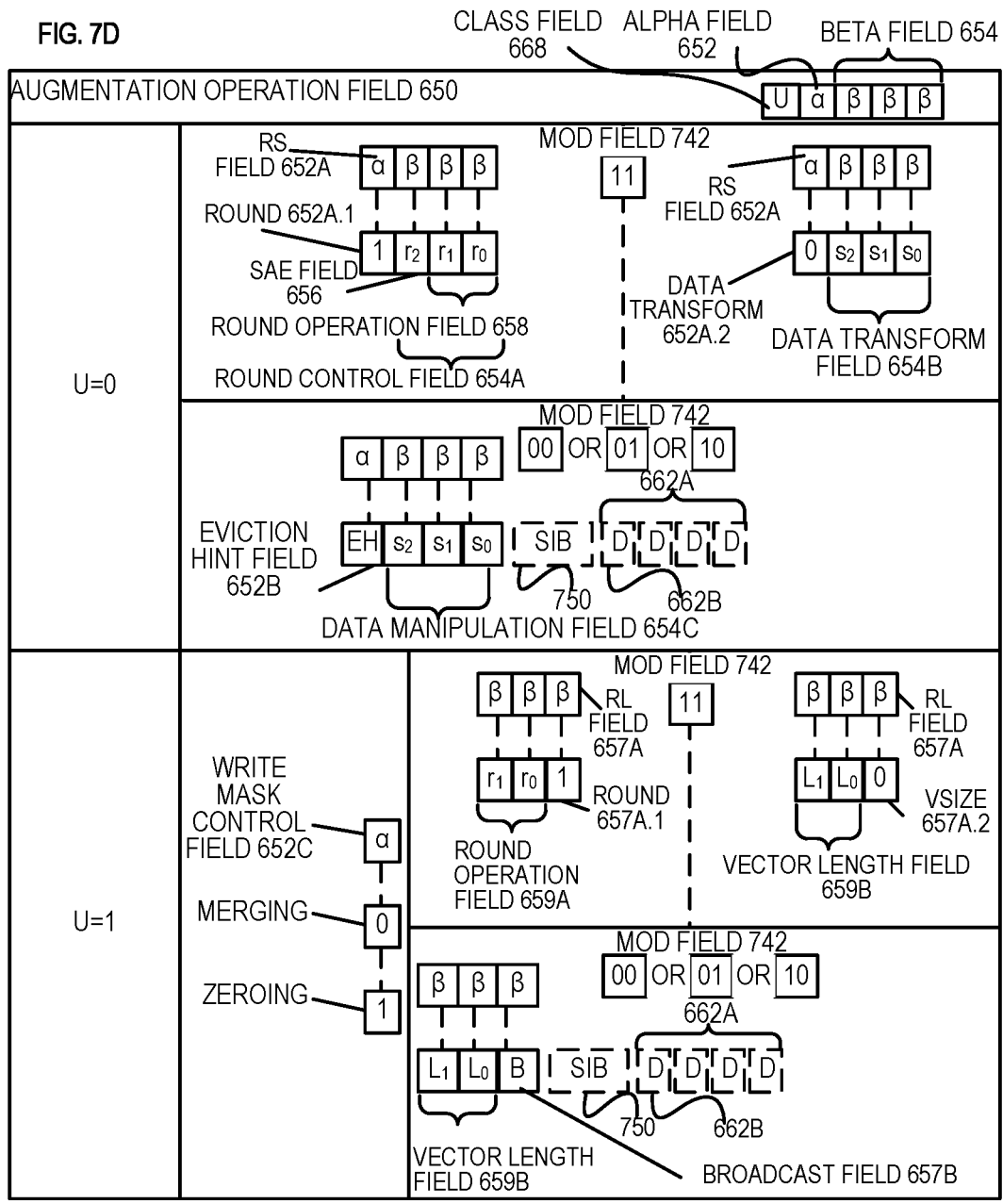

FIG. 7D is a block diagram illustrating the fields of the specific vector friendly instruction format 700 that make up the augmentation operation field 650 according to one embodiment of the invention. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]-EH) is interpreted as the rs field 652A. When the rs field 652A contains a 1 (round 652A.1), the beta field 654 (EVEX byte 3, bits [6:4]-SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]-SSS) is interpreted as a three bit data transform field 654B. When U=0 and the MOD field 742 contains 00, 01, or 10 (signifying a memory access operation), the alpha field 652 (EVEX byte 3, bit [7]-EH) is interpreted as the eviction hint (EH) field 652B and the beta field 654 (EVEX byte 3, bits [6:4]-SSS) is interpreted as a three bit data manipulation field 654C.

When U=1, the alpha field 652 (EVEX byte 3, bit [7]-EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]-$S_{2-1}$) is interpreted as the round operation field 659A, while when the RL field 657A contains a 0 (VSIZE 657.A2) the rest of the beta field 654 (EVEX byte 3, bit [6-5]-$S_{2-1}$) is interpreted as the vector length field 659B (EVEX byte 3, bit [6-5]-$L_{1-0}$). When U=1 and the MOD field 742 contains 00, 01, or 10 (signifying a memory access operation), the beta field 654 (EVEX byte 3, bits [6:4]-SSS) is interpreted as the vector length field 659B (EVEX byte 3, bit [6-5]-$L_{1-0}$) and the broadcast field 657B (EVEX byte 3, bit [4]-B).

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

Figure 9:
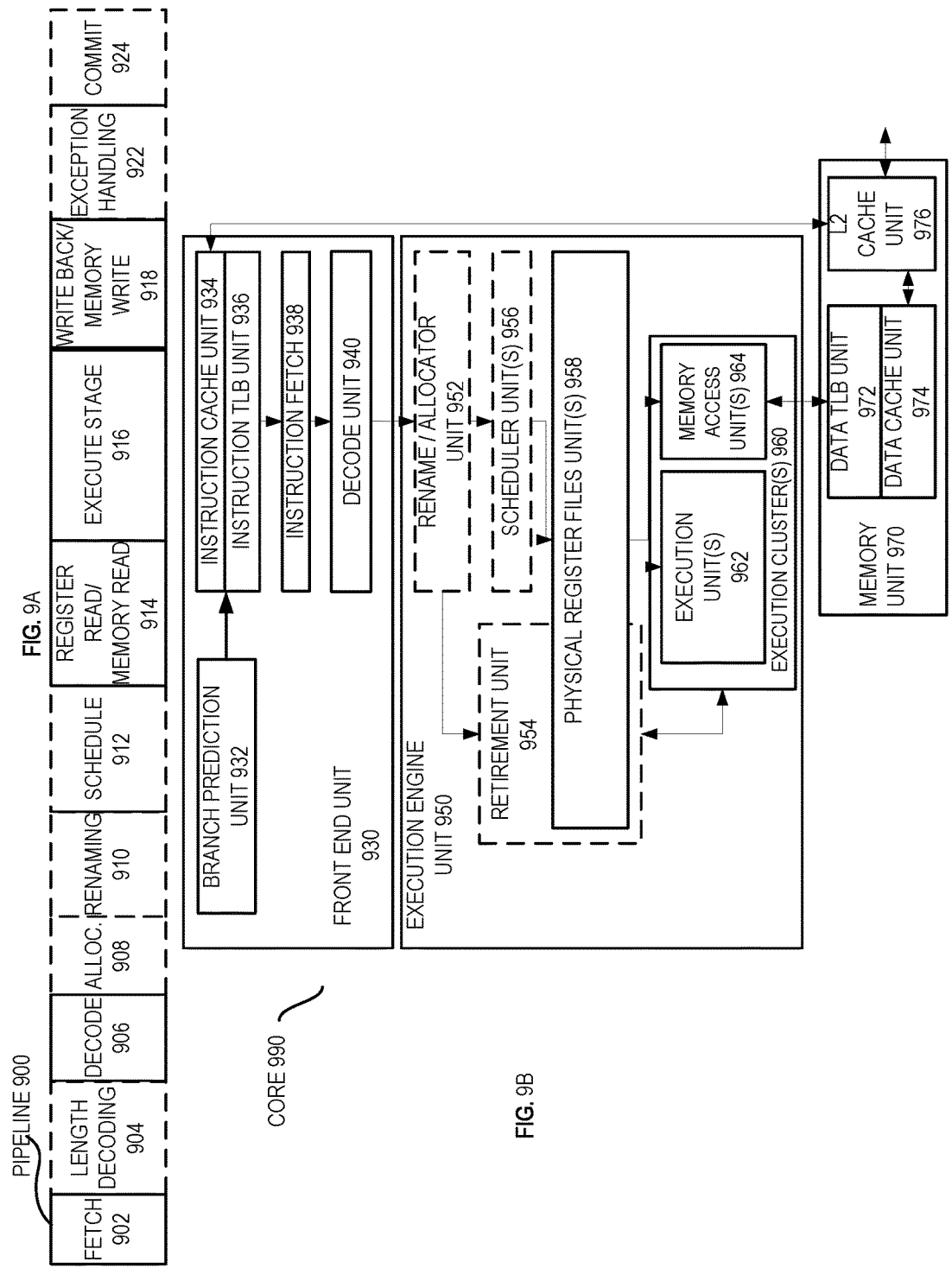
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10:
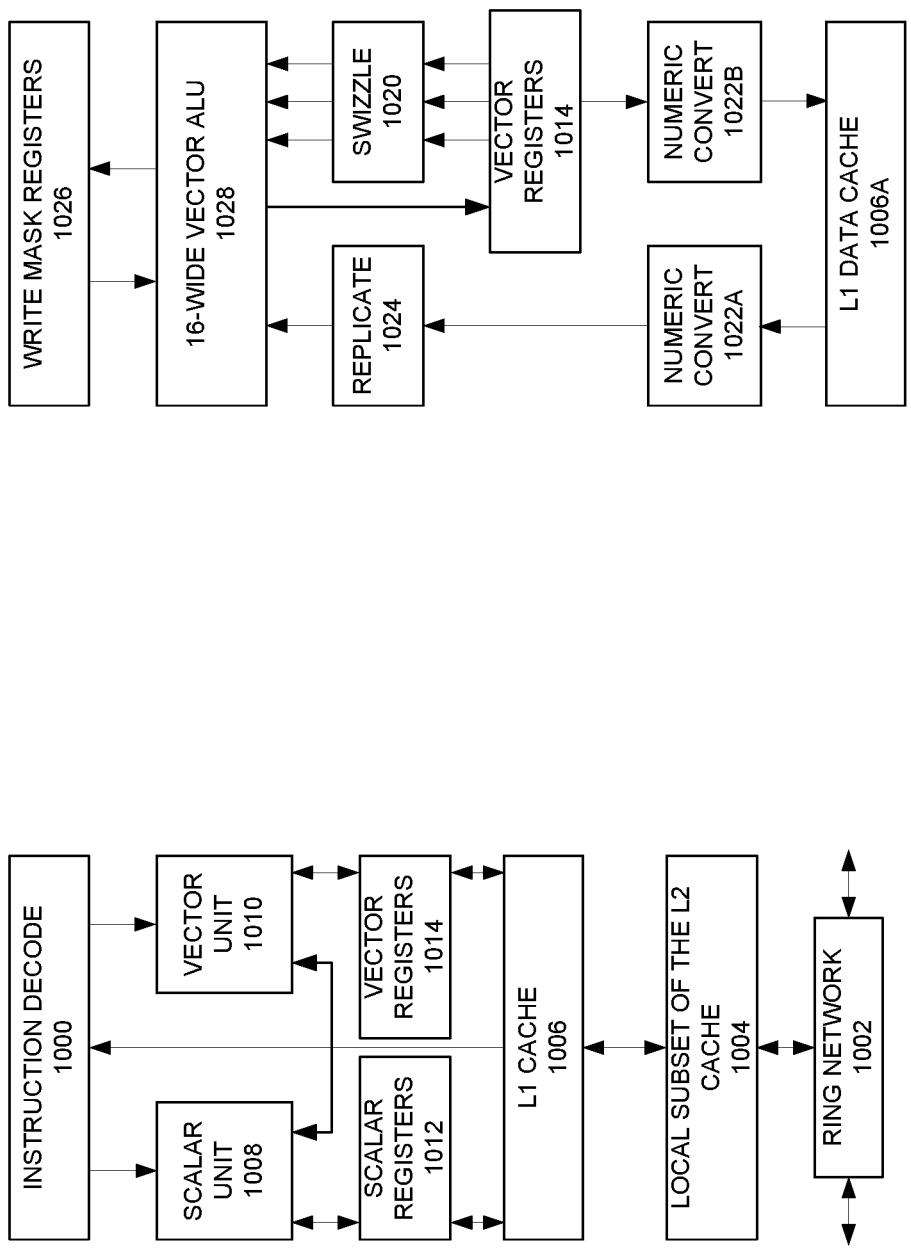
FIGS. 10A-B illustrate a block diagram of a more specific exemplary in-order core architecture, which core would be one of several logic blocks (including other cores of the same type and/or different types) in a chip.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
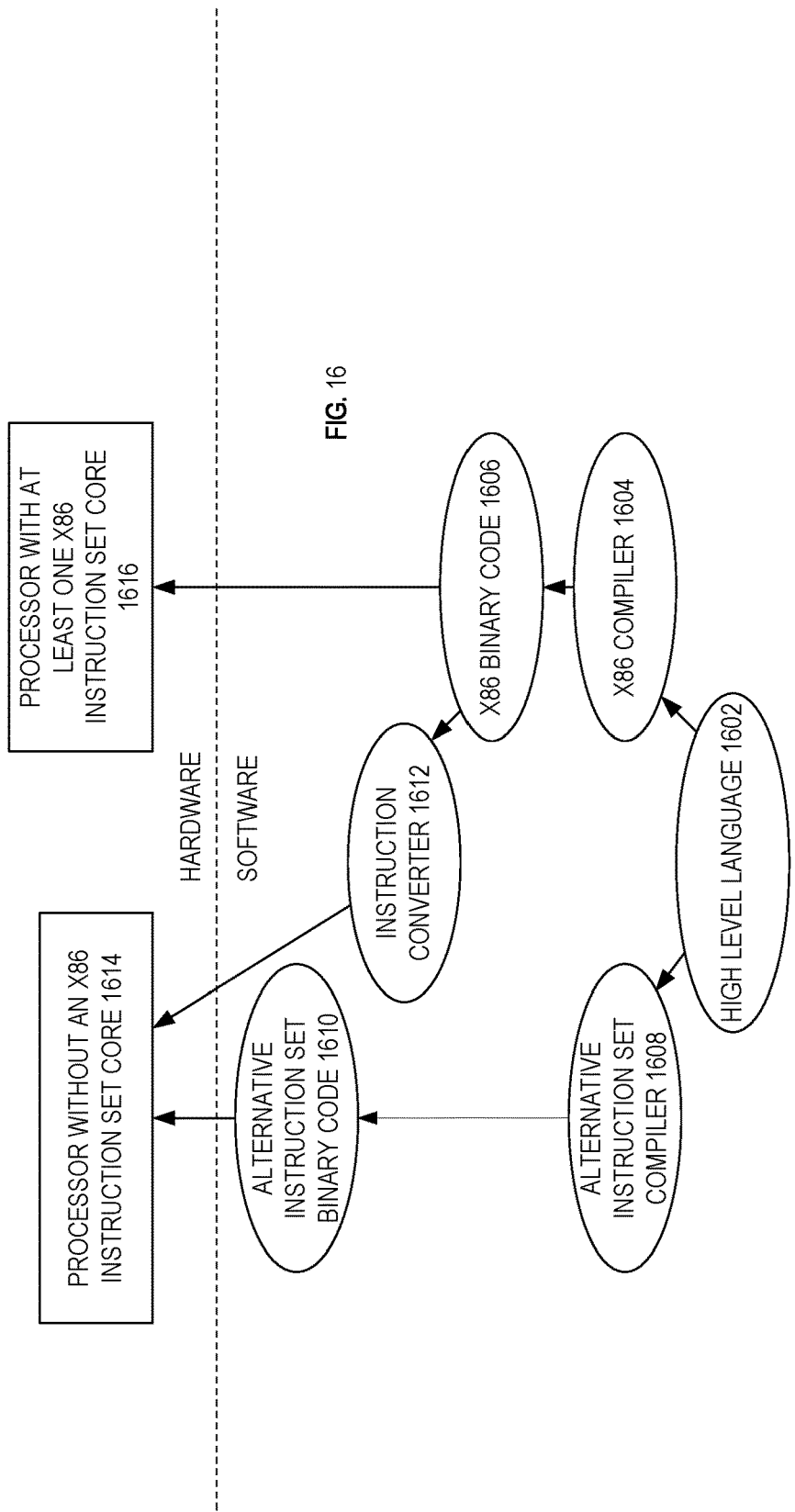
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 108 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a floating point number, e.g., a unified input operand and/or a unified output operand may comply and/or be compatible with a floating point number standard. For example, a floating point number, e.g., a unified input operand and/or a unified output operand may comply and/or be compatible with IEEE standard IEEE 754-2008, titled: IEEE Standard for Floating-Point Arithmetic, published in August 2008, by the IEEE, and/or later and/or earlier and/or related versions of this standard.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to a unified multifunction circuitry, as discussed below.

Example 1

According to this example, there is provided a unified multifunction circuitry. The unified multifunction circuitry includes a logarithm circuitry and an antilogarithm circuitry. The logarithm circuitry is to determine a log output operand. The log output operand includes a piecewise linear approximation of a base 2 logarithm of a significand of a log input operand. The antilogarithm circuitry is to determine an antilog output operand. The antilog output operand includes a piecewise linear approximation of a base 2 antilogarithm of a fraction of a selected input operand.

Example 2

This example includes the elements of example 1, further including an inverse circuitry to determine an inverse of the log output operand.

Example 3

This example includes the elements of example 1, further including a square root circuitry to determine a square root of the log output operand.

Example 4

This example includes the elements of example 1, wherein each piecewise linear approximation includes a number of segments, the number of segments related to a target precision.

Example 5

This example includes the elements according to any one of examples 1 to 4, wherein the log input operand and the antilog output operand are floating-point numbers.

Example 6

This example includes the elements of example 3, wherein determining the square root includes a right shift operation.

Example 7

This example includes the elements according to any one of examples 1 to 4, wherein the piecewise linear approximation of the base 2 logarithm and the piecewise linear approximation of the base 2 antilogarithm each includes factors that are negative powers of 2.

Example 8

This example includes the elements according to any one of examples 1 to 4, wherein the log output operand and the selected input operand are fixed point numbers.

Example 9

This example includes the elements according to any one of examples 1 to 4, wherein the selected input operand corresponds to an intermediate operand or an antilog input operand.

Example 10

This example includes the elements according to any one of examples 1 to 4, wherein the selected input operand corresponds to an intermediate operand, the intermediate operand related to the log output operand.

Example 11

According to this example, there is provided a method. The method includes determining, by a logarithm circuitry, a log output operand. The log output operand includes a piecewise linear approximation of a base 2 logarithm of a significand of a log input operand. The method further includes determining, by an antilogarithm circuitry, an antilog output operand. The antilog output operand includes a piecewise linear approximation of a base 2 antilogarithm of a fraction of a selected input operand.

Example 12

This example includes the elements of example 11, further including determining, by an inverse circuitry, an inverse of the log output operand.

Example 13

This example includes the elements of example 11, further including determining, by a square root circuitry, a square root of the log output operand.

Example 14

This example includes the elements of example 11, wherein each piecewise linear approximation includes a number of segments, the number of segments related to a target precision.

Example 15

This example includes the elements of example 11, wherein the log input operand and the antilog output operand are floating-point numbers.

Example 16

This example includes the elements of example 13, wherein determining the square root includes a right shift operation.

Example 17

This example includes the elements of example 11, wherein the piecewise linear approximation of the base 2 logarithm and the piecewise linear approximation of the base 2 antilogarithm each includes factors that are negative powers of 2.

Example 18

This example includes the elements of example 11, wherein the log output operand and the selected input operand are fixed point numbers.

Example 19

This example includes the elements of example 11, wherein the selected input operand corresponds to an intermediate operand or an antilog input operand.

Example 20

This example includes the elements of example 11, wherein the selected input operand corresponds to an intermediate operand, the intermediate operand related to the log output operand.

Example 21

According to this example, there is provided a system. The system includes a processor circuitry; a memory to store a log input operand; and a unified multifunction circuitry. The unified multifunction circuitry includes a logarithm circuitry and an antilogarithm circuitry. The logarithm circuitry is to determine the log output operand. The log output operand includes a piecewise linear approximation of a base 2 logarithm of a significand of a log input operand. The antilogarithm circuitry is to determine an antilog output operand. The antilog output operand includes a piecewise linear approximation of a base 2 antilogarithm of a fraction of a selected input operand.

Example 22

This example includes the elements of example 21, wherein the unified multifunction circuitry further includes an inverse circuitry to determine an inverse of the log output operand.

Example 23

This example includes the elements of example 21, wherein the unified multifunction circuitry further includes a square root circuitry to determine a square root of the log output operand.

Example 24

This example includes the elements of example 21, wherein each piecewise linear approximation includes a number of segments, the number of segments related to a target precision.

Example 25

This example includes the elements according to any one of examples 21 to 24, wherein the log input operand and the antilog output operand are floating-point numbers.

Example 26

This example includes the elements of example 23, wherein determining the square root includes a right shift operation.

Example 27

This example includes the elements according to any one of examples 21 to 24, wherein the piecewise linear approximation of the base 2 logarithm and the piecewise linear approximation of the base 2 antilogarithm each includes factors that are negative powers of 2.

Example 28

This example includes the elements according to any one of examples 21 to 24, wherein the log output operand and the selected input operand are fixed point numbers.

Example 29

This example includes the elements according to any one of examples 21 to 241, wherein the selected input operand corresponds to an intermediate operand or an antilog input operand.

Example 30

This example includes the elements according to any one of examples 21 to 24, wherein the selected input operand corresponds to an intermediate operand, the intermediate operand related to the log output operand.

Example 31

According to this example, there is provided a computer readable storage device. The device has stored thereon instructions that when executed by one or more processors result in the following operations including: determining a log output operand. The log output operand includes a piecewise linear approximation of a base 2 logarithm of a significand of a log input operand. The device further has stored thereon instructions that when executed by one or more processors result in the following operations including determining an antilog output operand. The antilog output operand includes a piecewise linear approximation of a base 2 antilogarithm of a fraction of a selected input operand.

Example 32

This example includes the elements of example 31, wherein the instructions that when executed by one or more processors results in the following additional operations including determining an inverse of the log output operand.

Example 33

This example includes the elements of example 31, wherein the instructions that when executed by one or more processors results in the following additional operations including determining a square root of the log output operand.

Example 34

This example includes the elements of example 31, wherein each piecewise linear approximation includes a number of segments, the number of segments related to a target precision.

Example 35

This example includes the elements according to any one of examples 31 to 34, wherein the log input operand and the antilog output operand are floating-point numbers.

Example 36

This example includes the elements of example 33, wherein determining the square root includes a right shift operation.

Example 37

This example includes the elements according to any one of examples 31 to 34, wherein the piecewise linear approximation of the base 2 logarithm and the piecewise linear approximation of the base 2 antilogarithm each includes factors that are negative powers of 2.

Example 38

This example includes the elements according to any one of examples 31 to 34, wherein the log output operand and the selected input operand are fixed point numbers.

Example 39

This example includes the elements according to any one of examples 31 to 34, wherein the selected input operand corresponds to an intermediate operand or an antilog input operand.

Example 40

This example includes the elements according to any one of examples 31 to 34, wherein the selected input operand corresponds to an intermediate operand, the intermediate operand related to the log output operand.

Example 41

According to this example, there is provided a device. The device includes means for determining, by a logarithm circuitry, a log output operand. The log output operand includes a piecewise linear approximation of a base 2 logarithm of a significand of a log input operand. The device further includes means for means for determining, by an antilogarithm circuitry, an antilog output operand. The antilog output operand includes a piecewise linear approximation of a base 2 antilogarithm of a fraction of a selected input operand.

Example 42

This example includes the elements of example 41, further including means for determining, by an inverse circuitry, an inverse of the log output operand.

Example 43

This example includes the elements of example 41, further including means for determining, by a square root circuitry, a square root of the log output operand.

Example 44

This example includes the elements of example 41, wherein each piecewise linear approximation includes a number of segments, the number of segments related to a target precision.

Example 45

This example includes the elements according to any one of examples 41 to 44, wherein the log input operand and the antilog output operand are floating-point numbers.

Example 46

This example includes the elements of example 43, wherein determining the square root includes a right shift operation.

Example 47

This example includes the elements according to any one of examples 41 to 44, wherein the piecewise linear approximation of the base 2 logarithm and the piecewise linear approximation of the base 2 antilogarithm each includes factors that are negative powers of 2.

Example 48

This example includes the elements according to any one of examples 41 to 44, wherein the log output operand and the selected input operand are fixed point numbers.

Example 49

This example includes the elements according to any one of examples 41 to 44, wherein the selected input operand corresponds to an intermediate operand or an antilog input operand.

Example 50

This example includes the elements according to any one of examples 41 to 44, wherein the selected input operand corresponds to an intermediate operand, the intermediate operand related to the log output operand.

Example 51

According to this example, there is provided a system. The system includes at least one device arranged to perform the method of any one of examples 11 to 20.

Example 52

According to this example, there is provided a device. The device includes means to perform the method of any one of examples 11 to 20.

Example 53

According to this example, there is provided a computer readable storage device. The device has stored thereon instructions that when executed by one or more processors result in the following operations including: the method according to any one of examples 11 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A unified multifunction circuitry comprising:
   a logarithm circuitry to determine, in a first single clock cycle, a log output operand, the log output operand comprising a piecewise linear approximation of a base 2 logarithm of a significand of a log input operand;
   an inverse/square root circuity to determine an intermediate operand based on the log output operand; and
   an antilogarithm circuitry to determine, in a second single clock cycle, an antilog output operand, the antilog output operand comprising a piecewise linear approximation of a base 2 antilogarithm of a fraction of the intermediate operand.

2. The unified multifunction circuitry of claim 1, wherein the intermediate operand is an inverse of the log output operand.

3. The unified multifunction circuitry of claim 1, wherein the intermediate operand is a square root of the log output operand.

4. The unified multifunction circuitry of claim 3, wherein determining the intermediate operand comprises a right shift operation.

5. The unified multifunction circuitry of claim 1, wherein each piecewise linear approximation comprises a number of segments, the number of segments related to a target precision.

6. The unified multifunction circuitry of claim 1, wherein the log input operand and the antilog output operand are floating-point numbers.

7. The unified multifunction circuitry of claim 1, wherein the piecewise linear approximation of the base 2 logarithm and the piecewise linear approximation of the base 2 antilogarithm each comprises factors that are negative powers of 2.

8. The unified multifunction circuitry of claim 1, wherein the log output operand and the selected input operand are fixed point numbers.

9. At least one non-transitory computer-readable storage device having stored thereon instructions which when executed by at least one processor result in operations comprising:
   determine, in a first single clock cycle, a log output operand, the log output operand comprising a piecewise linear approximation of a base 2 logarithm of a significand of a log input operand;
   determine, an intermediate operand based on the log output operand; and
   determine, in a second single clock cycle, an antilog output operand, the antilog output operand comprising a piecewise linear approximation of a base 2 antilogarithm of a fraction of the intermediate operand.

10. The at least one non-transitory computer-readable storage device of claim 9, wherein the intermediate operand is an inverse of the log output operand.

11. The at least one non-transitory computer-readable storage device of claim 9, wherein the intermediate operand is a square root of the log output operand.

12. The at least one non-transitory computer-readable storage device of claim 9, wherein each piecewise linear approximation comprises a number of segments, the number of segments related to a target precision.

13. The at least one non-transitory computer-readable storage device of claim 9, wherein the log input operand and the antilog output operand are floating-point numbers.

14. The at least one non-transitory computer-readable storage device of claim 9, wherein determining the intermediate operand comprises a right shift operation.

15. The at least one non-transitory computer-readable storage device of claim 9, wherein the piecewise linear approximation of the base 2 logarithm and the piecewise linear approximation of the base 2 antilogarithm each comprises factors that are negative powers of 2.

16. The at least one non-transitory computer-readable storage device of claim 9, wherein the log output operand and the selected input operand are fixed point numbers.

17. A system comprising:
   a processor circuitry;
   a memory to store a log input operand; and
   a unified multifunction circuitry comprising:
   a logarithm circuitry to determine, in a first single clock cycle, a log output operand, the log output operand comprising a piecewise linear approximation of a base 2 logarithm of a significand of the log input operand;
   an inverse/square root circuity to determine an intermediate operand based on the log output operand; and
   an antilogarithm circuitry to determine, in a second single clock cycle, an antilog output operand, the antilog output operand comprising a piecewise linear approximation of a base 2 antilogarithm of a fraction of the intermediate operand.

18. The system of claim 17, wherein the intermediate operand is an inverse of the log output operand.

19. The system of claim 17, wherein the intermediate operand is a square root of the log output operand.

20. The system of claim 19, wherein determining the intermediate operand comprises a right shift operation.

21. The system of claim 17, wherein each piecewise linear approximation comprises a number of segments, the number of segments related to a target precision.

22. The system of claim 17, wherein the log input operand and the antilog output operand are floating-point numbers.

23. The system of claim 17, wherein the piecewise linear approximation of the base 2 logarithm and the piecewise linear approximation of the base 2 antilogarithm each comprises factors that are negative powers of 2.

24. The system of claim 17, wherein the log output operand and the selected input operand are fixed point numbers.

* * * * *